US012669061B1

(12) United States Patent
Vitt et al.

(10) Patent No.: US 12,669,061 B1
(45) Date of Patent: Jun. 30, 2026

(54) AIRFOIL PROFILE FOR GAS TURBINE ENGINES

(71) Applicant: General Electric Company, Evendale, OH (US)

(72) Inventors: Paul Hadley Vitt, Liberty Township, OH (US); Thomas William Vandeputte, Scotia, NY (US); Harjit S. Hura, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/199,913

(22) Filed: May 6, 2025

(51) Int. Cl.
*F01D 5/14* (2006.01)
*F02C 3/04* (2006.01)

(52) U.S. Cl.
CPC ................ *F01D 5/141* (2013.01); *F02C 3/04* (2013.01); *F05D 2240/303* (2013.01); *F05D 2240/304* (2013.01)

(58) Field of Classification Search
CPC ........ F01D 5/141; F02C 3/04; F05D 2220/36; F05D 2240/303; F05D 2240/304
See application file for complete search history.

(56) References Cited

U.S. PATENT DOCUMENTS

| | | | |
|---|---|---|---|
| 7,047,167 B2 | 5/2006 | Yamaguchi et al. | |
| 7,374,403 B2 | 5/2008 | Decker et al. | |
| 8,864,457 B2 | 10/2014 | Malandra et al. | |
| 9,797,267 B2 | 10/2017 | Lohaus et al. | |

| | | | |
|---|---|---|---|
| 10,677,066 B2 | 6/2020 | Lewis et al. | |
| 11,371,359 B2 * | 6/2022 | Lecuyer | F01D 5/20 |
| 11,434,765 B2 * | 9/2022 | Sozio | F01D 5/141 |
| 11,454,120 B2 | 9/2022 | Fredmonski et al. | |
| 11,466,579 B2 * | 10/2022 | Correia | F01D 9/041 |
| 11,795,824 B2 * | 10/2023 | Vandeputte | F01D 5/18 |
| 11,852,161 B1 * | 12/2023 | Yao | F04D 29/324 |

(Continued)

FOREIGN PATENT DOCUMENTS

| | | | | | |
|---|---|---|---|---|---|
| CN | 119435142 A | * | 2/2025 | ............. | G06F 30/20 |
| EP | 3882436 B1 | * | 12/2022 | ............. | F01D 5/141 |

(Continued)

OTHER PUBLICATIONS

Thulin et al., NASA Energy Efficient Engine, High-Pressure Turbine Detailed Design Report, NASA-CR-165608, PWA-5594-171, 2013, 178 Pages. https //ntrs.nasa.gov/api/citations/19840020719/downloads/19840020719.pdf.

*Primary Examiner* — Craig Kim
(74) *Attorney, Agent, or Firm* — Dority & Manning, P.A.

(57) ABSTRACT

An airfoil assembly for a gas turbine engine includes at least two airfoils. Each airfoil of the at least two airfoils includes a leading edge, a trailing edge, a pressure side extending between the leading edge and the trailing edge, and a suction side opposite the pressure side. Each airfoil defines a chord line extending from the leading edge to the trailing edge along the pressure side, a suction side tangency point, a first reference line extending from the leading edge perpendicular to the chord line, a second reference line extending from the leading edge to the suction side tangency point, a camber line angle defined between the first reference line and the second reference line, and a solidity based on an axial width of the at least two airfoils and a pitch between adjacent ones of the at least two airfoils.

11 Claims, 7 Drawing Sheets

(56)  References Cited

U.S. PATENT DOCUMENTS

| | | | | |
|---|---|---|---|---|
| 11,885,233 | B2 | 1/2024 | Sozio et al. | |
| 11,913,353 | B2 * | 2/2024 | Place | F01D 5/141 |
| 12,006,876 | B2 * | 6/2024 | Schwarz | F02C 7/36 |
| 12,055,050 | B2 * | 8/2024 | Hughes | F01D 17/165 |
| 12,123,432 | B2 * | 10/2024 | Morin | F02C 3/107 |
| 12,209,557 | B1 * | 1/2025 | Miller | F02K 3/06 |
| 12,228,037 | B1 * | 2/2025 | Kray | F01D 9/041 |
| 12,291,979 | B1 * | 5/2025 | Vitt | F02C 3/04 |
| 12,331,661 | B2 * | 6/2025 | Kray | F01D 5/141 |
| 12,345,177 | B2 * | 7/2025 | Kray | F01D 5/282 |
| 2020/0182065 | A1 | 6/2020 | Fredmonski et al. | |
| 2021/0285329 | A1 * | 9/2021 | Hunter | F03D 1/0641 |
| 2023/0167742 | A1 * | 6/2023 | Vandeputte | F01D 5/18 |
| | | | | 416/223 R |
| 2024/0125241 | A1 * | 4/2024 | Power | F01D 5/141 |
| 2024/0392801 | A1 * | 11/2024 | Kray | F04D 29/324 |
| 2026/0021905 | A1 * | 1/2026 | Clough | B64C 3/56 |

FOREIGN PATENT DOCUMENTS

| | | | | |
|---|---|---|---|---|
| EP | 4560110 | A2 * | 5/2025 | F01D 5/147 |
| GB | 2327927 | A * | 2/1999 | B64C 27/001 |

* cited by examiner

AIRFOIL PROFILE FOR GAS TURBINE ENGINES

FIELD

The present disclosure relates to gas turbine engines, and more particularly to an airfoil profile for gas turbine engines.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s), which extract(s) energy from the combustion gases for powering the compressor(s), as well as for producing useful work to propel an aircraft in flight. The turbomachine is mechanically coupled to the fan for driving the fan during operation.

The turbine section of the gas turbine engine includes a plurality of stator vanes and a plurality of rotor blades. The plurality of stator vanes direct a flow of the combustion gases against the rotor blades. The curvature of the plurality of stator vanes creates a stagnation region of the hot combustion gases on a pressure side of the plurality of stator vanes, which is difficult to cool and results in decreased engine durability and engine performance. Accordingly, airfoil profiles for reducing stagnation on the pressure side of the plurality of stator vanes are desirable.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
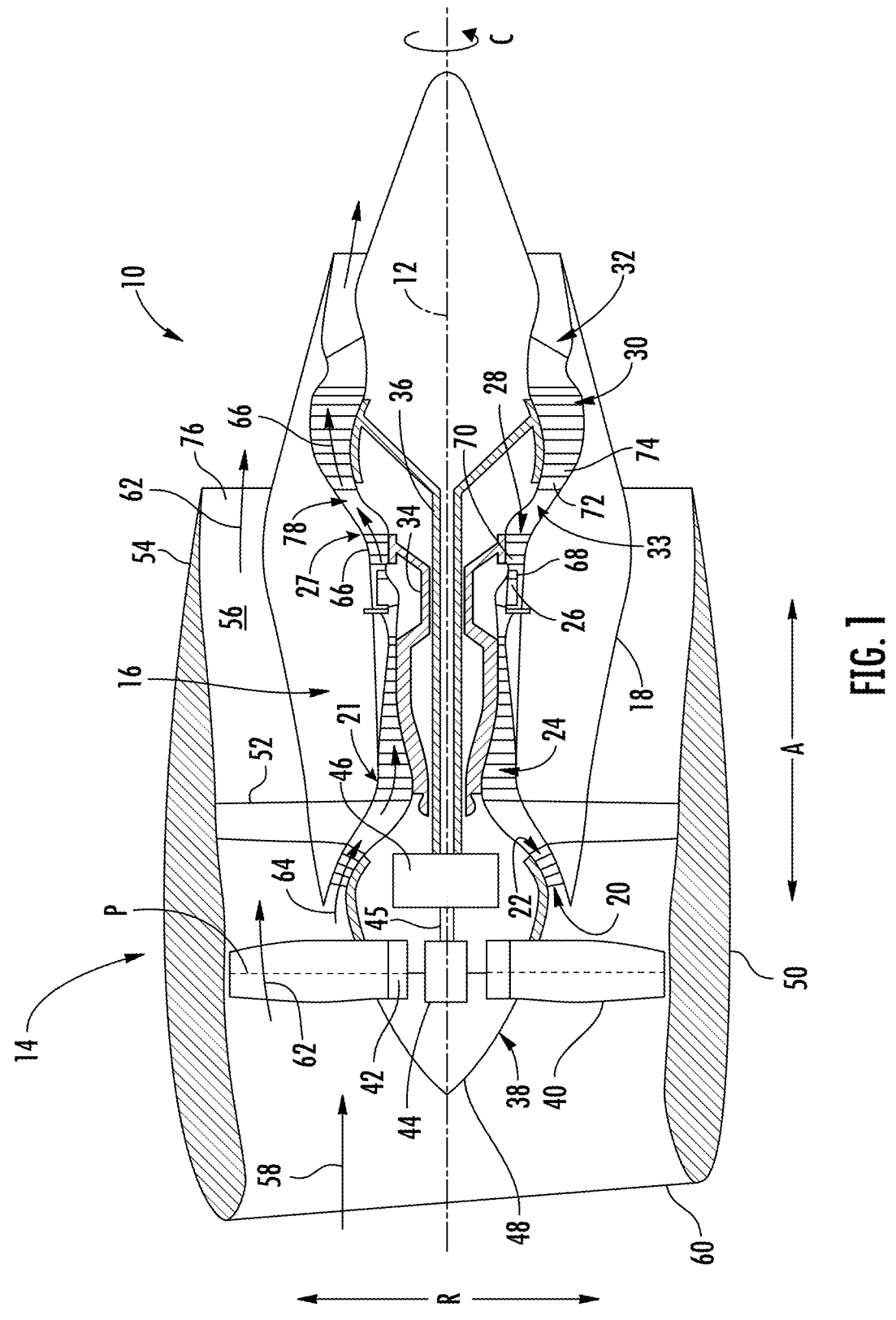
FIG. 1 is a schematic cross-sectional view of a gas turbine engine according to an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, and C" refers to only A, only B, only C, or any combination of A, B, and C.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

As used herein, a "bypass ratio" of a turbine engine is a ratio of bypass air through a bypass of the turbine engine to core air through a core inlet of a turbomachine of the turbine engine. For example, the bypass ratio is a ratio of bypass air entering the bypass airflow passage to core air entering the turbomachine.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first," "second," and "third" may be used interchangeably to distinguish one component from another and are not intended to signify location or importance of the individual components.

For purposes of the description hereinafter, the terms "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more nonstructural layers, and the one or more nonstructural layers contacting a second wall/surface).

A camber line angle (denoted "λ") is an angle defined between a first reference line extending through a leading edge of an airfoil and a second reference line extending from the leading edge to a suction side tangency point of the airfoil. The first reference line extends perpendicular to a chord line extending from the leading edge to the trailing edge of the airfoil.

An axial width (denoted "AW") extends between a leading edge and a trailing edge of an airfoil in an axial direction along longitudinal centerline axis of a gas turbine engine.

A leading edge angle (denoted "$\mu_{LE}$") is an angle defined between a first reference line extending through the leading edge of the airfoil and a horizontal reference line extending through the leading edge in a direction parallel to the longitudinal centerline axis of the gas turbine engine. The first reference line extends perpendicular to a chord line extending from the leading edge to the trailing edge of the airfoil.

The trailing edge angle (denoted "$\mu_{TE}$") is defined between a reference line extending through the trailing edge and a midpoint between the pressure side and the suction side of the airfoil and a tangent line extending through the trailing edge parallel to the longitudinal centerline axis of the gas turbine engine.

A change in surface area (denoted "ΔS") is defined is an arc length extending between two points on a curved surface of the airfoil.

An airfoil type (denoted "R") refers to whether the airfoil includes one of a plurality of airfoils forming a first stage of stator vanes or any other stator vanes or rotor blades of the turbine section. For example, the airfoil type R is equal to one (1) for a first stage of stator vanes of the turbine section, and the airfoil type R is equal to two (2) for the plurality of airfoils forming the plurality of rotor blades of the first stage of the turbine section and for the plurality of airfoils forming the plurality of stator vanes and the plurality of rotor blades of remaining stages of the turbine section.

A constant value (denoted "b") provides a values based on whether the airfoil includes one of a plurality of airfoils forming a first stage of stator vanes or the airfoils includes one of a plurality of airfoils forming the first stage of rotor blades, the second stage of stator vanes, or the second stage of rotor blades.

Generally, a gas turbine engine includes a fan and a turbomachine, with the turbomachine rotating the fan to generate thrust. The turbomachine includes a compressor section, a combustion section, a turbine section, and an exhaust section and defines a working gas flow path therethrough. The turbine section includes a plurality of stator vanes for directing a flow of combustion gases from the combustion section against a plurality of rotor blades. A solidity of the plurality of stator vanes, the plurality of rotor blades, or both is decreased by decreasing a number of the plurality of stator vanes and a number of the plurality of rotor blades. Decreasing the solidity improves durability and performance of the gas turbine engine. However, as a solidity of the turbine section decreases, a flow of the combustion gases stagnates on a pressure side of the plurality of stator vanes and the plurality of rotor blades. Such stagnation creates peak temperature regions on the pressure side aft of the leading edge, which is more difficult to cool. Accordingly, the peak temperature regions reduce durability and increase cooling requirements needed for the plurality of stator vanes and the plurality of rotor blades.

The present disclosure provides a means to reduce the formation of peak temperature regions on the pressure side of the plurality of stator vanes and the plurality of rotor blades while also decreasing the solidity in order to reduce cooling requirements, improve emissions, and improve durability. The disclosure includes an airfoil profile for the plurality of stator vanes and the plurality of rotor blades that increases a curvature at a leading edge of the plurality of stator vanes and the plurality of rotor blades. While such a configuration can result in a heavier airfoil and increase drag of the airfoil, the costs associated with the airfoil profile are overcome by improving cooling requirements of the turbine section. For example, the stagnation region of peak temperatures can be moved towards the leading edge for lower solidity airfoils where cooling can be focused, reducing overall cooling requirements for the airfoils. Additionally, because the amount of cooling air needed at the turbine section can be reduced, less air needs to be compressed by the compressor, increasing overall system performance.

Further, the inventors discovered during the course of designing several gas turbine engines having the airfoil profile noted above (including the configurations illustrated and described herein), that the airfoil profile of the plurality of stator vanes and the plurality of rotor blades of the turbine section in accordance with one or more of the exemplary aspects described herein result in a net benefit to the overall engine design.

Referring now to the drawings, FIG. 1 is a schematic cross-sectional view of a turbine engine 10 according to an exemplary embodiment of the present disclosure.

As shown in FIG. 1, the turbine engine 10 has an axial direction A (extending parallel to a longitudinal centerline axis 12) and a radial direction R that is normal to the axial direction A. In general, the turbine engine 10 includes a fan section 14 and a turbomachine 16 disposed downstream from the fan section 14.

The turbomachine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor ("LPC") 22 followed downstream by a high-pressure compressor ("HPC") 24, a combustion section 26, a turbine section 27, including a high-pressure turbine ("HPT") 28, followed downstream by a low-pressure turbine ("LPT") 30, and one or more core exhaust nozzles 32. A high-pressure ("HP") shaft 34 or a spool drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates. A low-pressure ("LP") shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustion section 26, the turbine section 27, and the one or more core exhaust nozzles 32 together define a working gas flow path 33. In at least one example embodiment, the combustion section 26 may include a rich burn combustor or a lean burn combustor.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are rotatable together about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38 and/or at least a portion of the turbomachine 16. The nacelle 50 is supported relative to the turbomachine 16 by a plurality of circumferentially spaced outlet guide vanes 52. Moreover, a downstream section 54 of the nacelle 50 extends over an outer portion of the turbomachine 16 to define a bypass airflow passage 56 therebetween. The one or more core exhaust nozzles 32 may extend through the nacelle 50 and be formed therein. In this exemplary embodiment, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 and/or the fan section 14. As the volume of air 58 passes across the fan blades 40, a first portion of air (bypass air 62) is directed or routed into the bypass airflow passage 56, and a second portion of air (core air 64) is directed or is routed into the upstream section of the working gas flow path 33, or, more specifically, into the annular core inlet 20. The ratio between the first portion of air (bypass air 62) and the second portion of air (core air 64) is known as a bypass ratio. In some embodiments, the bypass ratio is greater than 18:1. The pressure of the core air 64 is then increased by the LPC 22, generating compressed air 65 (FIG. 2), and the compressed air 65 is routed through the HPC 24 and further compressed before being directed into the combustion section 26, where the compressed air 65 is mixed with fuel and burned to generate combustion gases 66 (combustion products). One or more stages may be used in each of the LPC

22 and the HPC 24, with each subsequent stage further compressing the compressed air 65. The HPC 24 has a compression ratio greater than 20:1, preferably, in a range of 20:1 to 40:1. The compression ratio is a ratio of a pressure of a last stage of the HPC 24 to a pressure of a first stage of the HPC 24. The compression ratio may be greater than 20:1.

The combustion gases 66 are routed into the HPT 28 and expanded through the HPT 28 where a portion of thermal energy and/or kinetic energy from the combustion gases 66 is extracted via sequential stages of HPT stator vanes 68 that are coupled to the outer casing 18 and HPT rotor blades 70 that are coupled to the HP shaft 34, thus, causing the HP shaft 34 to rotate, thereby supporting operation of the HPC 24. The combustion gases 66 are then routed into the LPT 30 and expanded through the LPT 30. Here, a second portion of thermal energy and/or the kinetic energy is extracted from the combustion gases 66 via sequential stages of LPT stator 72 that are coupled to the outer casing 18 and LPT rotor blades 74 that are coupled to the LP shaft 36, thus, causing the LP shaft 36 to rotate, thereby supporting operation of the LPC 22 and rotation of the fan 38 via the gearbox assembly 46. One or more stages may be used in each of the HPT 28 and the LPT 30. The HPC 24 having a compression ratio in a range of 20:1 to 40:1 enables the HPT 28 to have a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the turbomachine 16 to provide propulsive thrust. Simultaneously with the flow of the core air 64 through the working gas flow path 33, the bypass air 62 is routed through the bypass airflow passage 56 before being exhausted from a fan bypass nozzle 76 of the turbine engine 10, also providing propulsive thrust. The HPT 28, the LPT 30, and the one or more core exhaust nozzles 32 at least partially define a hot gas path 78 for routing the combustion gases 66 through the turbomachine 16.

As noted above, the compressed air 65 (the core air 64) is mixed with the fuel in the combustion section 26 to generate a fuel and air mixture, and combusted, generating combustion gases 66 (combustion products). The fuel can include any type of fuel used for turbine engines, such as, for example, sustainable aviation fuels (SAF) including biofuels, JetA, or other hydrocarbon fuels. The fuel also may be a hydrogen-based fuel ($H_2$), and, while hydrogen-based fuel may include blends with hydrocarbon fuels, the fuel used herein is preferably unblended, and referred to herein as hydrogen fuel. In some embodiments, the hydrogen fuel may comprise substantially pure hydrogen molecules (i.e., diatomic hydrogen). The fuel may also be a cryogenic fuel. For example, when the hydrogen fuel is used, the hydrogen fuel may be stored in a liquid phase at cryogenic temperatures.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turboprop engines, ground power generation machines, or a combination thereof.

Figure 2:
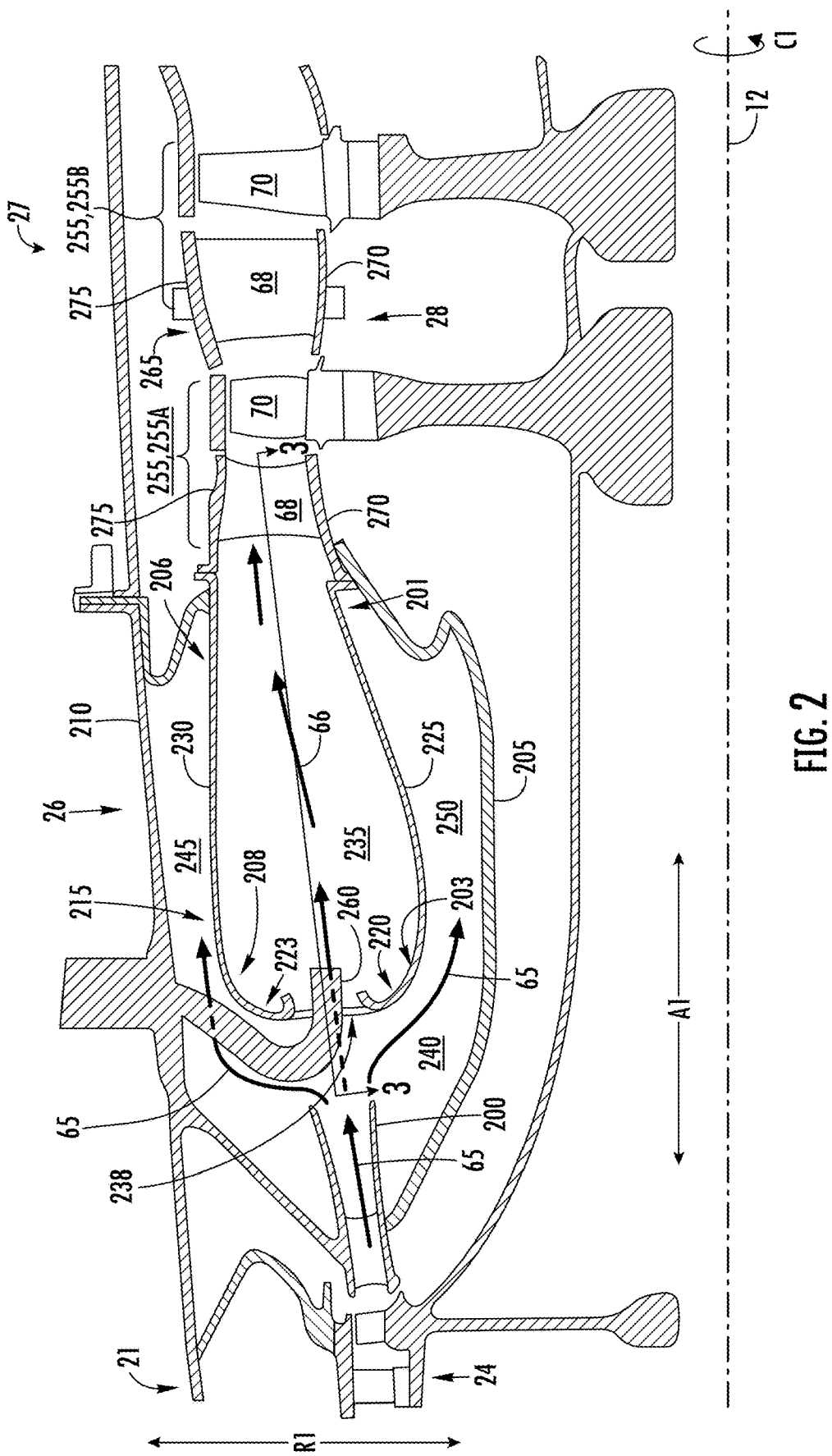
FIG. 2 is a side, cross-sectional view of a compressor section, a combustion section, and a turbine section of the gas turbine engine of FIG. 1 according to an exemplary embodiment of the present disclosure.

FIG. 2 is a side, cross-sectional view of the compressor section 21, the combustion section 26, and the turbine section 27 of the turbine engine 10 of FIG. 1 according to an exemplary embodiment of the present disclosure. More specifically, a rear end of the HPC 24, the combustion section 26, and a forward end of the HPT 28 are illustrated.

Compressed air 65 exits the HPC 24 through an annular diffuser 200 located at the rear end or outlet of the HPC 24 and diffuses into the combustion section 26. The combustion section 26 of the turbomachine 16 is annularly encased by an inner combustor casing 205 and an outer combustor casing 210 radially spaced from the inner combustor casing 205. The radially spaced inner combustor casing 205 and the outer combustor casing 210 both extend generally along axial direction A1 and surround a combustor assembly 215 in annular rings. The inner and outer combustor casings 205, 210 are joined together at the annular diffuser 200 at the forward end of the combustion section 26.

As shown, the combustor assembly 215 generally includes an inner liner 225 extending between a rear end 201 and a forward end 203 generally along the axial direction A1, as well as an outer liner 230 also extending between a rear end 206 and a forward end 208 generally along the axial direction A1. The inner and outer liners 225, 230 together at least partially define a combustion chamber 235 therebetween. The inner and outer liners 225, 230 are each attached to or formed integrally with an annular dome. More particularly, the annular dome includes an inner dome section 220 formed integrally with the forward end 203 of the inner liner 225 and an outer dome section 223 formed generally with the forward end 208 of the outer liner 230. Further, the inner and outer dome section 220, 223 may each be formed integrally (or alternatively may be formed of a plurality of components attached in any suitable manner) and may each extend along the circumferential direction C1 to define an annular shape. It should be appreciated, however, that in other example embodiments, the combustor assembly 215 may not include the inner and/or outer dome sections 220, 223; may include separately formed inner and/or outer dome sections 220,223 attached to the respective inner liner 225 and outer liner 230; or may have any other suitable configuration.

Referring still to FIG. 2, the combustor assembly 215 further includes a plurality of fuel air mixers 238 spaced along the circumferential direction C1 and positioned at least partially within the annular dome. More particularly, the plurality of fuel air mixers 238 are disposed at least partially between the outer dome section 223 and the inner dome section 220 along the radial direction R1. The plurality of fuel air mixers 238 include a plurality of fuel nozzles 260 also spaced along the circumferential direction C1. Compressed air 65 from the compressor section 21 of the turbine engine 10 flows into or through the plurality of fuel air mixers 238, where the compressed air 65 is mixed with fuel from the plurality of fuel nozzles 260 and ignited to create combustion gases 66 within the combustion chamber 235. The inner and outer dome sections 220, 223 are configured to assist in providing such a flow of the compressed air 65 from the compressor section 21 into or through the plurality of fuel air mixers 238.

As discussed above, the combustion gases 66 flow from the combustion chamber 235 into and through the turbine section 27 of the turbine engine 10, where a portion of thermal and/or kinetic energy from the combustion gases 66 is extracted via sequential stages of turbine stator vanes and turbine rotor blades within the HPT 28 and LPT 30. More specifically, as shown in FIG. 2, combustion gases 66 from the combustion chamber 235 flow into the HPT 28, located immediately downstream of the combustion chamber 235, where thermal and/or kinetic energy from the combustion gases 66 is extracted via sequential stages of HPT stator vanes 68 and HPT rotor blades 70.

As illustrated in FIG. 2, not all compressed air 65 flows into or directly through the plurality of fuel air mixers 238 and into the combustion chamber 235. Some of the compressed air 65 is discharged into a plenum 240 surrounding the combustor assembly 215. Plenum 240 is generally defined between the inner and outer combustor casings 205, 210 and the inner and outer liners 225, 230. The outer combustor casing 210 and the outer liner 230 define an outer plenum 245 generally disposed radially outward from the combustion chamber 235. The inner combustor casing 205 and the inner liner 225 define an inner plenum 250 generally disposed radially inward with respect to the combustion chamber 235. As compressed air 65 is diffused by the annular diffuser 200, some of the compressed air 65 flows radially outward into the outer plenum 245 and some of the compressed air 65 flows radially inward into the inner plenum 250.

The compressed air 65 flowing radially outward into the outer plenum 245 flows generally axially to the turbine section 27. Specifically, the compressed air 65 flows above the HPT stator vanes 68 and the HPT rotor blades 70. The outer plenum 245 may extend to the LPT 30 (shown in FIG. 1) as well.

In at least one example embodiment, the turbine section 27 includes an inner band 270 and an outer band 275 radially spaced from the inner band 270. The inner band 270 and the outer band 275 define at least a portion of the working gas flow path 33 (FIG. 1). The HPT stator vanes 68 may extend into the working gas flow path from the inner band 270, the outer band 275, or both the inner band 270 and the outer band 275.

In at least one example embodiment, the HPT 28 includes a plurality of turbine stages 255 with each of the plurality of turbine stages 255 including the plurality of HPT stator vanes 68 and the plurality of HPT rotor blades 70. For example, as shown in FIG. 2, the plurality of turbine stages 255 includes a first stage 255A and a second stage 255B. The first stage 255A may be at a forward or most-upstream end of the HPT 28 and the second stage 255B may be downstream of the first stage 255A.

Figures 3, 4:
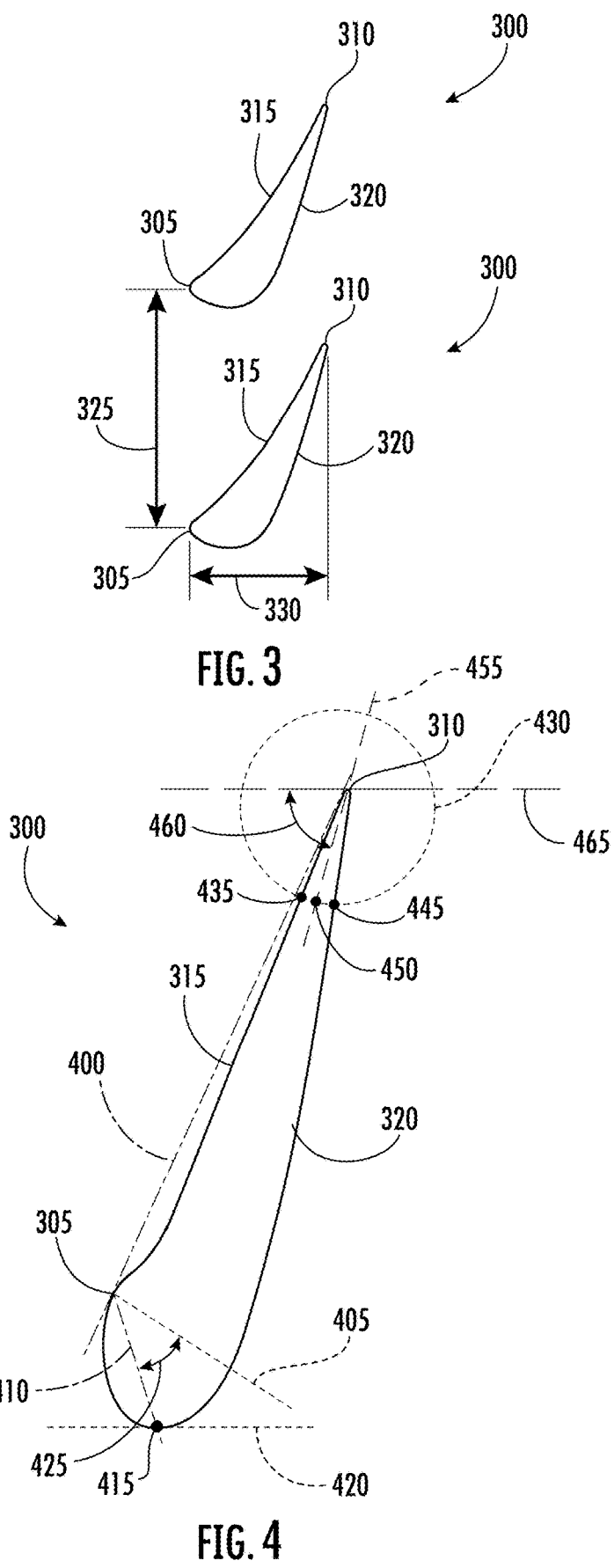
FIG. 3 is a top, cross-sectional view of a pair of stator vanes of the turbine section of FIG. 2 according to an exemplary embodiment of the present disclosure.
FIG. 4 is a detailed view of one of the stator vanes of FIG. 3 according to an exemplary embodiment of the present disclosure.

FIG. 3 is a top, cross-sectional view of a pair of airfoils 300 of the turbine section 27 of FIG. 2 according to an exemplary embodiment of the present disclosure. FIG. 4 is a detailed view of one of the airfoils 300 of FIG. 3 according to an exemplary embodiment of the present disclosure. More particularly, the airfoils 300 illustrated in FIGS. 3-4 include the first stage 255A of the HPT stator vanes 68 shown in FIG. 2.

The airfoils 300 include a leading edge 305, a trailing edge 310, a pressure side 315 extending between the leading edge 305 and the trailing edge 310, and a suction side 320 opposite the pressure side 315 and extending between the leading edge 305 and the trailing edge 310. The leading edge 305 of the airfoils 300 is spaced a distance apart in the circumferential direction C1 (FIG. 2) defined by an airfoil pitch 325. The airfoil pitch 325 is defined between the leading edge 305 of adjacent ones of the airfoils 300. In at least one example embodiment, the airfoil pitch 325 between each of the airfoils 300 may vary radially. For example, the airfoil pitch between each of the airfoils 300 may vary along a span extending between a root and a tip of the airfoils 300, such as between the inner band 270 and the outer band 275 shown in FIG. 2.

Additionally, the airfoils 300 define an axial width 330 extending between the leading edge 305 and the trailing edge 310 extending along the longitudinal centerline axis 12 (FIGS. 1-2). The axial width 330 may vary along the span extending between the root and the tip of the airfoils 300, such as between the inner band 270 and the outer band 275 shown in FIG. 2. In at least one example embodiment, the axial width 330 of each of the airfoils 300 is the same. In other example embodiments, the axial width 330 of one or more of the airfoils 300 may vary.

The airfoils 300 define a solidity. The solidity is defined as the axial width 330 divided by the airfoil pitch 325. The solidity may be defined at any radial location along the span on the airfoils 300. The solidity defined by the airfoils 300 is less than or equal to 0.85.

Referring now to FIG. 4, a chord line 400 extends from the leading edge 305 to the trailing edge 310 and defines a straight line distance between the leading edge 305 to the trailing edge 310. The chord line 400 may be positioned at a desired radial location along the span of the airfoils 300, such as between the inner band 270 and the outer band 275 shown in FIG. 2. Moreover, the chord line 400 extends along the pressure side 315 of the airfoils 300.

A first reference line 405 extends through the leading edge 305 perpendicular to the chord line 400. Additionally, a second reference line 410 extends from the leading edge 305 to a suction side tangency point 415. The suction side tangency point 415 is a point of tangency along the suction side 320 relative to a first tangent line 420 extending parallel to the longitudinal centerline axis 12 (FIGS. 1-2). Moreover, a camber line angle 425 is defined between the first reference line 405 and the second reference line 410. The camber line angle 425 is greater than or equal to 13.4° and less than or equal to 83.45°.

A trailing edge reference circle 430 is centered on the trailing edge 310 of the airfoils 300. The trailing edge reference circle 430 has a diameter equal to 20% of the axial width 330 of the airfoils 300. The trailing edge reference circle 430 intersects the pressure side 315 at a first point 435 and intersects the suction side 320 at a second point 440. The trailing edge reference circle 430 also intersects a midpoint 450 defined halfway between the first point 435 and the second point 440. For example, the midpoint 450 is between the pressure side 315 and the suction side 320 of the airfoils 300. Moreover, a third reference line 455 extends from the trailing edge 310 and through the midpoint 450. A trailing edge angle 460 is defined between the third reference line 455 and a second tangent line 465 extending through the trailing edge 310 parallel to the longitudinal centerline axis 12 (FIGS. 1-2). As shown in FIG. 4, the trailing edge angle 460 is adjacent the pressure side 315 of the airfoils 300. In at least one example embodiment, the trailing edge angle 460 is greater than or equal to 40° and less than or equal to 80°.

Figures 5, 6:
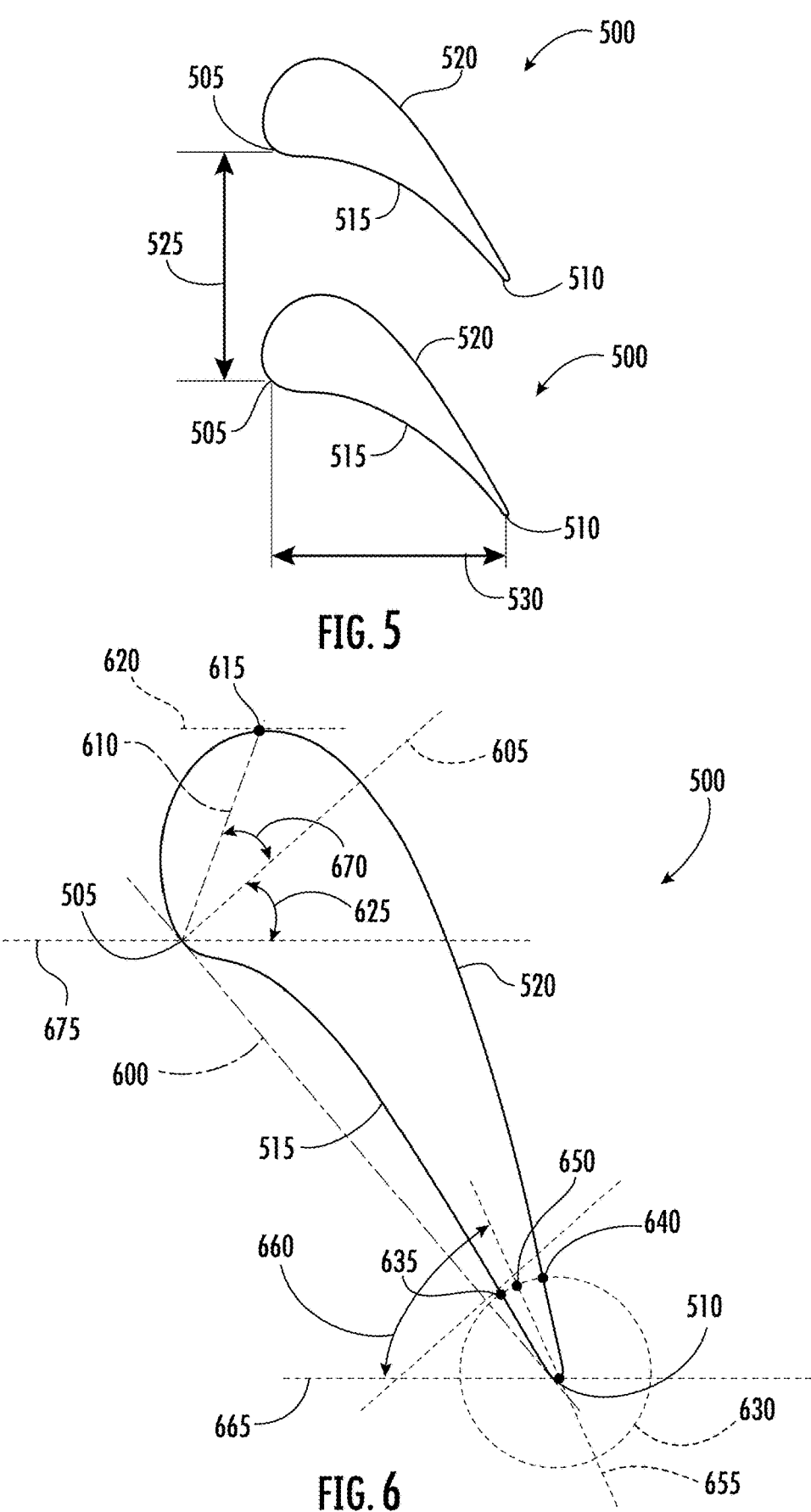
FIG. 5 is a top, cross-sectional view of a pair of rotor blades of the turbine section of FIG. 2 according to an exemplary embodiment of the present disclosure.
FIG. 6 is a detailed view of one of the rotor blades of FIG. 5 according to an exemplary embodiment of the present disclosure.

FIG. 5 is a top, cross-sectional view of a pair of airfoils 500 of the turbine section 27 of FIG. 2 according to an exemplary embodiment of the present disclosure. FIG. 6 is a detailed view of one of the airfoils 500 of FIG. 5 according to an exemplary embodiment of the present disclosure. The airfoils 500 may be similar or analogous to the airfoils 300 discussed above with respect to FIGS. 3-4. More particularly, the airfoils 500 illustrated in FIGS. 5-6 may include the first stage 255A and the second stage 255B of the HPT rotor blades 70 and the second stage 255B stator vanes 68 shown in FIG. 2.

The airfoils 500 include a leading edge 505, a trailing edge 510, a pressure side 515 extending between the leading edge 505 and the trailing edge 510, and a suction side 520 opposite the pressure side 515 and extending between the leading edge 505 and the trailing edge 510. The leading edge 505 of the airfoils 500 is spaced a distance apart in the circumferential direction C1 (FIG. 2) defined by an airfoil pitch 525. The airfoil pitch 525 is defined between the leading edge 505 of adjacent ones of the airfoils 500. In at least one example embodiment, the airfoil pitch 525 between each of the airfoils 500 may vary radially. For example, the airfoil pitch between each of the airfoils 300 may vary along a span extending between a root and a tip of the airfoils 300, such as between the inner band 270 and the outer band 275 shown in FIG. 2.

Additionally, the airfoils 500 define an axial width 530 extending between the leading edge 505 and the trailing edge 510 extending along the longitudinal centerline axis 12 (FIGS. 1-2). In at least one example embodiment, the axial width 530 of each of the airfoils 500 is the same. In other example embodiments, the axial width 530 of one or more of the airfoils 500 may vary. Moreover, the axial width 530 may vary along the span extending between the root and the tip of the airfoils 300, such as between the inner band 270 and the outer band 275 shown in FIG. 2.

The airfoils 500 define a solidity. The solidity is defined as the axial width 530 divided by the airfoil pitch 525. The solidity defined by the airfoils 500 is greater than or equal to 0.3 and less than or equal to 0.85.

Referring now to FIG. 6, a chord line 600 extends from the leading edge 505 to the trailing edge 510 and defines a straight line distance between the leading edge 505 to the trailing edge 510. Moreover, the chord line 600 extends along the pressure side 515 of the airfoils 500. A first reference line 605 extends through the leading edge 505 perpendicular to the chord line 600. Additionally, a second reference line 610 extends from the leading edge 505 to a suction side tangency point 615. The suction side tangency point 615 is a point of tangency along the suction side 520 relative to a first tangent line 620 extending parallel to the longitudinal centerline axis 12 (FIGS. 1-2). Moreover, a camber line angle 670 is defined between the first reference line 605 and the second reference line 610. The camber line angle 670 is greater than or equal to 13.4° and less than or equal to 83.45°.

A trailing edge reference circle 630 is centered on the trailing edge 510 of the airfoils 500. The trailing edge reference circle 630 has a diameter equal to 20% of the axial width 530 of the airfoils 500. The trailing edge reference circle 630 intersects the pressure side 515 at a first point 635 and intersects the suction side 520 at a second point 640. The trailing edge reference circle 630 also intersects a midpoint 650 defined halfway between the first point 635 and the second point 640. For example, the midpoint 650 is between the pressure side 515 and the suction side 520 of the airfoils 500. Moreover, a third reference line 655 extends from the trailing edge 510 and through the midpoint 650. A trailing edge angle 660 is defined between the third reference line 655 and a second tangent line 665 extending through the trailing edge 510 parallel to the longitudinal centerline axis 12 (FIGS. 1-2). As shown in FIG. 6, the trailing edge angle 660 is adjacent the pressure side 515 of the airfoils 500. In at least one example embodiment, the trailing edge angle 660 is greater than or equal to 400 and less than or equal to 80°.

Moreover, a leading edge angle 625 is defined between the first reference line 605 and a horizontal reference line 675 extending through the leading edge 505 parallel to the longitudinal centerline axis 12 (FIGS. 1-2). In at least one example embodiment, the leading edge angle 625 is greater than or equal to 0° and less than or equal to 55°.

The inventors developed multiple airfoil profiles for the plurality of stator vanes and the plurality of rotor blades for gas turbine engines and determined that a significant relationship exists between a solidity $\sigma$, a leading edge angle $\mu_{LE}$, a trailing edge angle $\mu_{TE}$, an airfoil lift factor $Z$, reference airfoil lift factor $Z_{ref}$ (based on the airfoil lift factor $Z$ where the solidity $\sigma$ is equal to 1), an induced leading edge air angle $\chi_{ind}$, a camber line angle $\lambda$, an optimal leading edge droop factor $\lambda'$, an airfoil type $R$, and a constant $b$ based on the airfoil type $R$.

As stated above, the inventors created solutions that reduce the formation of peak temperature regions on the pressure side of the plurality of stator vanes and the plurality of rotor blades while also decreasing solidity in order to reduce cooling requirements, improve emissions, and improve durability for a defined engine environment. Table 1 below illustrates 31 examples (denoted Ex. 1-31) of turbine engines 10 having airfoil profiles that increases a curvature at a leading edge of the plurality of stator vanes and the plurality of rotor blades for the plurality of stator vanes and the plurality of rotor blades developed by the inventors. Table 1 includes a values, $\mu_{LE}$ values, $\mu_{TE}$ values, $Z_{ref}$ values, $Z$ values, $\lambda_{ind}$ values, $\lambda$ values, $\lambda'$ values, b values, R values, and n$\lambda$ values.

The inventors found that airfoil profile designs with parameters defined in Examples 1-31 reduce the formation of peak temperature regions on the pressure side of the plurality of stator vanes and the plurality of rotor blades, which reduces cooling requirements, improves system performance, and improves durability while remaining within current engine constraints. The examples developed by the inventors shown in Table 1 can be characterized by a leading edge droop effect LEDE or, more particularly, a normalized leading edge droop effect nLEDE. The leading edge droop effect LEDE and the normalized leading edge droop effect nLEDE can be thought of as an indicator of the effect of the airfoil profile on heat transfer at the leading edge of the airfoils forming the plurality of stator vanes and the plurality of rotor blades. As such, the leading edge droop effect LEDE and the normalized leading edge droop effect nLEDE can be used to identify an improved airfoil profile design.

The leading edge droop effect LEDE measures a heat transfer effect based on the camber line angle $\lambda$ defined at a leading edge of each of the airfoils. The camber line angle $\lambda$ is measured in degrees and is the camber line angle 425, 670 discussed with respect to FIGS. 4 and 6. The leading edge droop effect LEDE is a dimensionless quantity that relates a first heat transfer Nnd$_r$ and a penalty factor $\Delta$DQW. The leading edge droop effect LEDE is greater than or equal to 1.8 and less than or equal to 5.47. The leading edge droop effect LEDE is defined as follows:

$$\text{Nnd}_r + [0.075(\Delta\text{DQW})] \tag{1}$$

The first heat transfer factor Nnd$_r$ is a dimensionless quantity resulting from moving a stagnation region of peak temperatures away from the suction side 320, 520 of the airfoils 300, 500. Stated differently, the first heat transfer

TABLE 1

| | | | | | | | | | | | | |
|---|---|---|---|---|---|---|---|---|---|---|---|---|
| | | | | | Parameter | | | | | | | |
| | $\sigma$ | $\mu_{LE}$ | $\mu_{TE}$ | $Z_{ref}$ | $Z$ | $\chi_{ind}$ | $\lambda$ | $\lambda'$ | b | R | n$\lambda$ | |
| Units | n/a | ° | ° | n/a | n/a | ° | ° | n/a | n/a | n/a | n/a | |
| Ex. 1 | 0.6 | 0 | 75 | 0.500 | 0.833 | 68.104 | 68.104 | 1.000 | 3 | 1 | 0.955 | |
| Ex. 2 | 0.45 | 0 | 75 | 0.500 | 1.111 | 77.635 | 77.635 | 1.000 | 3 | 1 | 1.027 | |
| Ex. 3 | 0.3 | 0 | 75 | 0.500 | 1.667 | 83.449 | 83.449 | 1.000 | 3 | 1 | 1.136 | |
| Ex. 4 | 0.7 | 45 | 70 | 0.877 | 1.252 | 24.007 | 24.007 | 1.000 | 4 | 2 | 1.093 | |
| Ex. 5 | 0.6 | 45 | 70 | 0.877 | 1.461 | 29.047 | 29.047 | 1.000 | 4 | 2 | 1.136 | |
| Ex. 6 | 0.5 | 45 | 70 | 0.877 | 1.753 | 33.105 | 33.105 | 1.000 | 4 | 2 | 1.189 | |
| Ex. 7 | 0.3 | 0 | 75 | 0.500 | 1.667 | 83.449 | 26.286 | 0.315 | 3 | 1 | 0.358 | |
| Ex. 8 | 0.6 | 45 | 70 | 0.877 | 1.461 | 29.047 | 18.736 | 0.645 | 4 | 2 | 0.733 | |
| Ex. 9 | 0.5 | 45 | 70 | 0.877 | 1.753 | 33.105 | 15.129 | 0.457 | 4 | 2 | 0.543 | |
| Ex. 10 | 0.7 | 45 | 70 | 0.877 | 1.252 | 24.007 | 19.086 | 0.795 | 4 | 2 | 0.869 | |
| Ex. 11 | 0.45 | 0 | 75 | 0.500 | 1.111 | 77.635 | 44.252 | 0.570 | 3 | 1 | 0.585 | |
| Ex. 12 | 0.6 | 0 | 75 | 0.500 | 0.833 | 68.104 | 54.483 | 0.800 | 3 | 1 | 0.764 | |
| Ex. 13 | 0.85 | 45 | 70 | 0.877 | 1.031 | 13.955 | 13.397 | 0.960 | 4 | 2 | 1.000 | |
| Ex. 14 | 0.8 | 0 | 75 | 0.500 | 0.625 | 43.015 | 41.940 | 0.975 | 3 | 1 | 0.867 | |
| Ex. 15 | 0.7 | 45 | 70 | 0.877 | 1.252 | 24.007 | 21.606 | 0.900 | 4 | 2 | 0.984 | |
| Ex. 16 | 0.45 | 0 | 60 | 0.866 | 1.925 | 64.715 | 60.185 | 0.930 | 3 | 1 | 0.955 | |
| Ex. 17 | 0.5 | 55 | 70 | 0.977 | 1.954 | 24.882 | 22.394 | 0.900 | 4 | 2 | 1.070 | |
| Ex. 18 | 0.6 | 0 | 75 | 0.500 | 0.833 | 68.104 | 63.336 | 0.930 | 3 | 1 | 0.889 | |
| Ex. 19 | 0.45 | 10 | 75 | 0.524 | 1.164 | 68.586 | 63.785 | 0.930 | 3 | 1 | 0.955 | |
| Ex. 20 | 0.45 | 0 | 70 | 0.643 | 1.428 | 73.417 | 66.075 | 0.900 | 3 | 1 | 0.924 | |
| Ex. 21 | 0.5 | 45 | 55 | 1.598 | 3.195 | 28.738 | 25.002 | 0.870 | 4 | 2 | 1.035 | |
| Ex. 22 | 0.6 | 45 | 70 | 0.877 | 1.461 | 29.047 | 25.271 | 0.870 | 4 | 2 | 0.989 | |
| Ex. 23 | 0.5 | 50 | 75 | 0.660 | 1.319 | 30.713 | 26.721 | 0.870 | 4 | 2 | 1.035 | |
| Ex. 24 | 0.45 | 0 | 75 | 0.500 | 1.111 | 77.635 | 65.213 | 0.840 | 3 | 1 | 0.862 | |
| Ex. 25 | 0.5 | 45 | 65 | 1.123 | 2.247 | 31.435 | 26.405 | 0.840 | 4 | 2 | 0.999 | |
| Ex. 26 | 0.45 | 0 | 80 | 0.342 | 0.760 | 81.791 | 65.433 | 0.800 | 3 | 1 | 0.821 | |
| Ex. 27 | 0.5 | 45 | 70 | 0.877 | 1.753 | 33.105 | 26.484 | 0.800 | 4 | 2 | 0.951 | |
| Ex. 28 | 0.3 | 0 | 75 | 0.500 | 1.667 | 83.449 | 66.759 | 0.800 | 3 | 1 | 0.909 | |
| Ex. 29 | 0.5 | 30 | 45 | 1.577 | 3.155 | 35.104 | 26.328 | 0.750 | 4 | 2 | 0.892 | |
| Ex. 30 | 0.5 | 20 | 40 | 1.412 | 2.824 | 37.456 | 26.219 | 0.700 | 4 | 2 | 0.832 | |
| Ex. 31 | 0.5 | 10 | 40 | 1.192 | 2.384 | 40.000 | 24.000 | 0.600 | 4 | 2 | 0.714 | | factor $Nnd_r$ is a dimensionless quantity resulting from moving a stagnation region of peak temperatures away from the leading edge 305, 505 along the pressure side 315, 515. The first heat transfer factor $Nnd_r$ is based on the induced leading edge air angle $\chi_{ind}$ measured in degrees and is determined by dividing the second heat transfer factor $Nnd_e$ by the second heat transfer factor $Nnd_e$ where the induced leading air angle $\chi_{ind}$ is equal to zero (0) degrees. The first heat transfer factor $Nnd_r$ is expressed according to (2) as follows:

$$\frac{Nnd_c}{Nnd_c(\chi_{ind} = 0)} \tag{2}$$

The second heat transfer factor $Nnd_c$ relates the effect of the induced leading air angle $\chi_{ind}$ on the heat transfer of the airfoils 300, 500. When the induced leading air angle $\chi_{ind}$ is small or equal to zero, the heat transfer to the airfoils 300, 500 is reduced. When the induced leading air angle $\chi_{ind}$ increases, the airfoils 300, 500 block more airflow which increases the heat transfer. Accordingly, the second heat transfer factor $Nnd_e$ is based on the induced leading air angle $\chi_{ind}$ and the constant value b. The constant value b is equal to 3 for the first stage 255A of the plurality of stator vanes 68 and the constant value b is equal to 4 for the first stage 255A of the plurality of rotor blades and the second stage 255B of the plurality of stator vanes 68 and the plurality of rotor blades 70. The second heat transfer factor $Nnd_c$ is defined as follows:

$$\sqrt{\left(80.54\cos(\chi_{ind})^{0.612}\right)^2 + \left(193.64 \cdot b \cdot \sin(\chi_{ind})^{0.804}\right)^2} \tag{3}$$

The induced leading air angle $\chi_{ind}$ is measured in degrees in the circumferential direction C, C1 (FIGS. 1-2) about the longitudinal centerline axis 12 of the turbine engine 10. The induced leading air angle $\chi_{ind}$ is based on the solidity $\sigma$ of the turbine section 27 of the turbine engine 10, the reference airfoil lift factor $Z_{ref}$, the leading edge angle $\mu_{LE}$ measured in degrees, and the trailing edge angle $\mu_{TE}$ measured in degrees. The induced leading air angle $\chi_{ind}$ is defined as follows:

$$\left\{\tan^{-1}\left[\frac{Z_{ref}/\sigma}{2\cos\mu_{TE}^2}\right] - \tan\mu_{TE}\right\} - \mu_{LE} \tag{4}$$

The solidity $\sigma$ is a dimensionless quantity determined by dividing an axial width AW of the airfoils 300, 500 by a tangential pitch P of the airfoils 300, 500. The axial width AW is the axial width 330, 530 of the airfoils 300, 500 and the tangential pitch P is the airfoil pitch 325, 525 of the airfoils 300, 500. The axial width AW and the tangential pitch P are geometric measurements and may be measured in units of feet, inches, or centimeters, for example. The solidity $\sigma$ is greater than or equal to 0.3 and less than or equal to 0.85. The solidity $\sigma$ is defined as follows:

$$\frac{AW}{P} \tag{5}$$

The reference airfoil lift factor $Z_{ref}$ is a dimensionless quantity determined based on the airfoil lift factor Z where the solidity $\sigma$ is equal to one (1). The airfoil lift factor Z is a measure of an amount of lift by the airfoils 300, 500 relative to an idealized airfoil lift for a given amount of turning, indicated by the leading edge angle $\mu_{LE}$ and the trailing edge angle $\mu_{TE}$. For example, if the airfoil lift factor Z is greater than 1, an airfoil is having to generate more lift than the idealized airfoil lift, which can lead to increased losses. Accordingly, the airfoil lift factor Z is a dimensionless quantity based on the solidity $\sigma$, the leading edge angle $\mu_{LE}$, and the trailing edge angle $\mu_{TE}$. The airfoil lift factor Z is defined as follows:

$$Z = \left(\frac{2}{\sigma}\right) \cdot \left[\left(\cos\mu_{TE}^2\right) \cdot \left(\tan\mu_{LE} + \tan\mu_{TE}\right)\right] \tag{6}$$

Accordingly, the reference airfoil lift factor $Z_{ref}$, where the solidity $\sigma$ is equal to one (1), may be re-written as follows:

$$Z(\sigma=1) \tag{6.1}$$

The leading edge angle $\mu_{LE}$ for the airfoils 300, 500 is greater than or equal to 0° and less than or equal to 55°. More particularly, the leading edge angle $\mu_{LE}$ for the airfoils 300 forming the first stage 255A of the HPT stator vanes 68 is greater than or equal to 0° and less than or equal to 10°. The leading edge angle $\mu_{LE}$ for the airfoils 300 forming the second stage 255B of the HPT stator vanes 68 and the airfoils 500 forming first stage 255A and the second stage 255B of the HPT rotor blades 70 is greater than or equal to 0° and less than or equal to 55°. Moreover, the leading edge angle $\mu_{LE}$ is the leading edge angle 625 described with respect to FIG. 6.

The trailing edge angle $\mu_{TE}$ for the airfoils 300, 500 is greater than or equal to 400 and less than or equal to 80°. More particularly, the trailing edge angle $\mu_{TE}$ for the airfoils 300 forming the first stage 255A of the HPT stator vanes 68 is greater than or equal to 600 and less than or equal to 80°. The trailing edge angle $\mu_{TE}$ for the airfoils 300 forming the second stage 255B of the HPT stator vanes 68 and the airfoils 500 forming first stage 255A and the second stage 255B of the HPT rotor blades 70 is greater than or equal to 400 and less than or equal to 75°. Moreover, the trailing edge angle $\mu_{TE}$ is the trailing edge angle 460, 660 discussed with respect to FIGS. 4 and 6.

The penalty factor $\Delta DQW$ is a penalty factor representing an increase in aerodynamic drag, heat load, and weight as a result of increasing a surface area of the airfoils 300, 500 as the camber line angle $\lambda$ is increased. The penalty factor $\Delta DQW$ is a dimensionless quantity based on a change in surface area $\Delta S$ of the suction side 320, 520 of the airfoils 300, 500 due to the camber line angle $\lambda$. The change in surface area $\Delta S$ is based on a first length a and a second length b.

Figure 7:
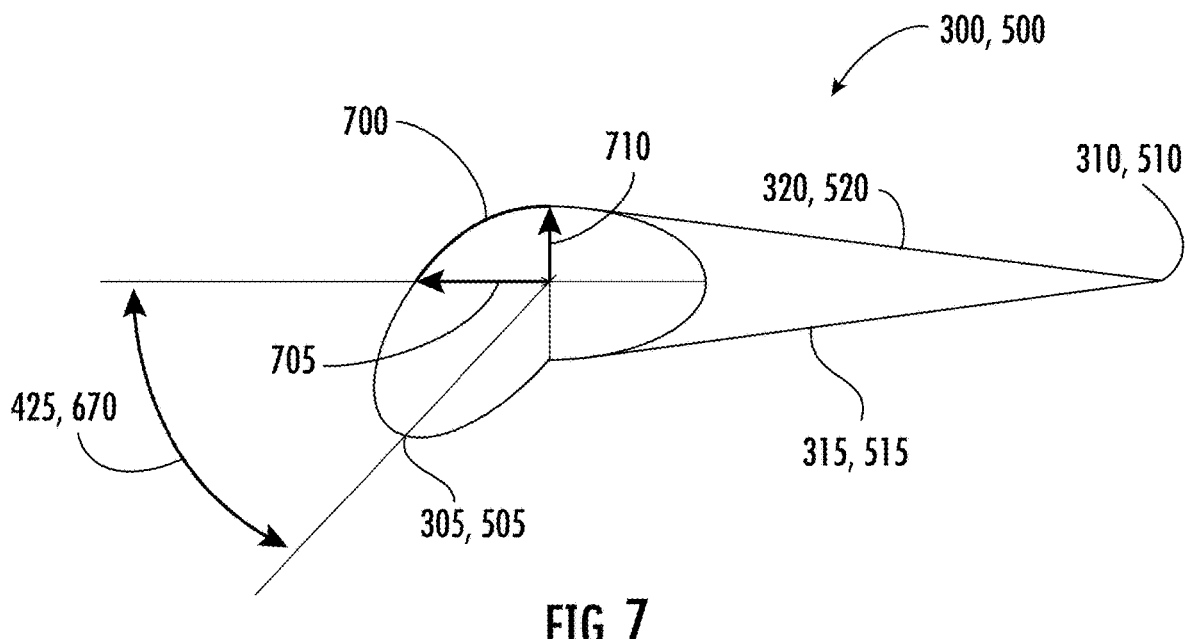
FIG. 7 is a schematic diagram of an airfoil according to an exemplary embodiment of the present disclosure.

With reference to FIG. 7, illustrating a schematic diagram of one of the airfoils 300, 500 according to an exemplary embodiment of the present disclosure, the change in surface area $\Delta S$ is an arc length 700 defined by a first length 705 and a second length 710 extending perpendicular to the first length 705. For the exemplary airfoil 300, 500 shown in FIG. 7, the first length 705 and the second length 710 are measured from a center of an ellipses forming the leading edge 305, 505 prior to forming the camber line angle 525, 670. Moreover, the change in surface area $\Delta S$ is based on the airfoil type R, the constant b, and the camber line angle $\lambda$. Accordingly, the change in surface area $\Delta S$ is defined as follows:

$$1 + \frac{Rb\pi\lambda}{0.5\sqrt{1+b^2}} \qquad (7)$$

The airfoil type R is a dimensionless quantity determined based on which stage of the plurality of turbine stages 255 the airfoil belongs. The airfoil type R is equal to one (1) for a first stage of stator vanes of the turbine section 27, and the airfoil type R is equal to two (2) for the remaining rotor blades and stator vanes of the turbine section 27. For example, the airfoil type R is equal to 1 for the airfoils 300 forming the first stage 255A of the plurality of HPT stator vanes 68 and the airfoil type R is equal to 2 for the airfoils 300, 500 forming the first stage 255A of the HPT rotor blades 70, the second stage 255B of the HPT stator vanes 68, and the second stage 255B of the HPT rotor blades 70.

The constant value b of Expressions (3) is a dimensionless quantity determined based on which stage of the plurality of turbine stages 255 the airfoil belongs. For example, the constant value b is equal to 3 when the airfoil type R is equal to 1 and the constant value b is equal to 4 when the airfoil type R is equal to 2.

The camber line angle λ is the camber line angle 425, 670 discussed with respect to FIGS. 4 and 6 is measured in degrees and converted to radians for use in Expression (7).

The penalty factor ΔDQW is based on the camber line angle λ, the airfoil type R, and the change in surface area ΔS. The penalty factor ΔDQW is defined as follows:

$$\Delta DQW = 0.05(\Delta S)^6 \qquad (8)$$

Accordingly, the penalty factor ΔDQW may be re-written incorporating the change in surface area ΔS of Expression (7) as follows:

$$\Delta DQW = 0.05\left(1 + \frac{Rb\pi\lambda}{0.5\sqrt{1+b^2}}\right)^6 \qquad (8.1)$$

Moreover, the leading edge droop effect LEDE of (1) can be re-written incorporating (8.1) as follows:

$$LEDE = Nnd_r + \left[0.075\left(0.05\left(1 + \frac{Rb\pi\lambda}{0.5\sqrt{1+b^2}}\right)^6\right)\right] \qquad (8.2)$$

The leading edge droop effect LEDE of (8.2) can be re-written as follows for the airfoils 300 forming a first stage of stator vanes of the turbine section 27 (such that the airfoil type R is equal to 1 and the constant b is equal to 3):

$$Nnd_r + 0.075\left(0.05\left(1 + \frac{1 \cdot 3 \cdot \pi\lambda a}{0.5\sqrt{1+3^2}}\right)^6\right) \qquad (8.3)$$

The leading edge droop effect LEDE of (8.2) can be re-written as follows for the airfoils 300 forming a first stage of rotor blades and remaining stages of stator vanes and rotor blades of the turbine section 27 that are not first stage stator vanes (such that the airfoil type R is equal to 2 and the constant b is equal to 4):

$$Nnd_r + 0.075\left(0.05\left(1 + \frac{2 \cdot 4 \cdot \pi\lambda a}{0.5\sqrt{1+4^2}}\right)^6\right) \qquad (8.4)$$

The camber line angle λ is based on the optimal leading edge droop factor λ' and the induced leading air angle $\chi_{ind}$. The optimal leading edge droop factor λ' is a factor applied to the induced leading air angle $\chi_{ind}$. As the optimal leading edge droop factor λ' is varied for a given induced leading air angle $\chi_{ind}$, the camber line angle λ changes and so the design of the airfoils 300, 500 changes. Moreover, as the optimal leading edge droop factor λ' is increased, the heat load on the airfoils 300, 500 is decreased. Accordingly, a range of values for the optimal leading edge droop factor λ' can be used to determine a desired value or a range of desired values for the camber line angle λ. In at least one example embodiment, the optimal leading edge droop factor λ' is greater than or equal to 0.315 and less than or equal to 1. The camber line angle λ is defined as follows:

$$\lambda' \cdot \chi_{ind} \qquad (9)$$

Moreover, the leading edge droop effect LEDE can be normalized based on the optimal leading edge droop factor λ' being equal to 1. Accordingly, the normalized leading edge droop effect nLEDE is defined as follows:

$$\frac{LEDE(\lambda' = 1)}{LEDE} \qquad (10)$$

Additionally, the camber line angle λ can be normalized based on the optimal leading edge droop factor λ' and the airfoil lift factor Z. Accordingly, a normalized camber line angle nλ is defined as follows:

$$\lambda' \cdot Z^{0.25} \qquad (11)$$

Values for the normalized leading edge droop effect nLEDE for each of the examples of Table 1 are shown in Table 2.

TABLE 2

| | | | | | | Parameter | | | | | | |
| | σ | $\mu_{LE}$ | $\mu_{TE}$ | $Z_{ref}$ | Z | $\chi_{ind}$ | λ | λ' | b | R | nλ | nLEDE |
| Units | n/a | ° | ° | n/a | n/a | ° | ° | n/a | n/a | n/a | n/a | n/a |
| Ex. 1 | 0.6 | 0 | 75 | 0.500 | 0.833 | 68.104 | 68.104 | 1.000 | 3 | 1 | 0.955 | 1.000 |
| Ex. 2 | 0.45 | 0 | 75 | 0.500 | 1.111 | 77.635 | 77.635 | 1.000 | 3 | 1 | 1.027 | 1.000 |
| Ex. 3 | 0.3 | 0 | 75 | 0.500 | 1.667 | 83.449 | 83.449 | 1.000 | 3 | 1 | 1.136 | 1.000 |
| Ex. 4 | 0.7 | 45 | 70 | 0.877 | 1.252 | 24.007 | 24.007 | 1.000 | 4 | 2 | 1.093 | 1.000 |
| Ex. 5 | 0.6 | 45 | 70 | 0.877 | 1.461 | 29.047 | 29.047 | 1.000 | 4 | 2 | 1.136 | 1.000 |
| Ex. 6 | 0.5 | 45 | 70 | 0.877 | 1.753 | 33.105 | 33.105 | 1.000 | 4 | 2 | 1.189 | 1.000 |
| Ex. 7 | 0.3 | 0 | 75 | 0.500 | 1.667 | 83.449 | 26.286 | 0.315 | 3 | 1 | 0.358 | 1.000 |
| Ex. 8 | 0.6 | 45 | 70 | 0.877 | 1.461 | 29.047 | 18.736 | 0.645 | 4 | 2 | 0.733 | 1.000 |
| Ex. 9 | 0.5 | 45 | 70 | 0.877 | 1.753 | 33.105 | 15.129 | 0.457 | 4 | 2 | 0.543 | 1.001 |
| Ex. 10 | 0.7 | 45 | 70 | 0.877 | 1.252 | 24.007 | 19.086 | 0.795 | 4 | 2 | 0.869 | 1.001 |

TABLE 2-continued

| | | | | | | Parameter | | | | | | |
|---|---|---|---|---|---|---|---|---|---|---|---|---|
| Units | $\sigma$<br>n/a | $\mu_{LE}$<br>° | $\mu_{TE}$<br>° | $Z_{ref}$<br>n/a | $Z$<br>n/a | $\chi_{ind}$<br>° | $\lambda$<br>° | $\lambda'$<br>n/a | $b$<br>n/a | $R$<br>n/a | $n\lambda$<br>n/a | nLEDE<br>n/a |
| Ex. 11 | 0.45 | 0 | 75 | 0.500 | 1.111 | 77.635 | 44.252 | 0.570 | 3 | 1 | 0.585 | 1.001 |
| Ex. 12 | 0.6 | 0 | 75 | 0.500 | 0.833 | 68.104 | 54.483 | 0.800 | 3 | 1 | 0.764 | 1.004 |
| Ex. 13 | 0.85 | 45 | 70 | 0.877 | 1.031 | 13.955 | 13.397 | 0.960 | 4 | 2 | 1.000 | 1.007 |
| Ex. 14 | 0.8 | 0 | 75 | 0.500 | 0.625 | 43.015 | 41.940 | 0.975 | 3 | 1 | 0.867 | 1.008 |
| Ex. 15 | 0.7 | 45 | 70 | 0.877 | 1.252 | 24.007 | 21.606 | 0.900 | 4 | 2 | 0.984 | 1.037 |
| Ex. 16 | 0.45 | 0 | 60 | 0.866 | 1.925 | 64.715 | 60.185 | 0.930 | 3 | 1 | 0.955 | 1.039 |
| Ex. 17 | 0.5 | 55 | 70 | 0.977 | 1.954 | 24.882 | 22.394 | 0.900 | 4 | 2 | 1.070 | 1.043 |
| Ex. 18 | 0.6 | 0 | 75 | 0.500 | 0.833 | 68.104 | 63.336 | 0.930 | 3 | 1 | 0.889 | 1.049 |
| Ex. 19 | 0.45 | 10 | 75 | 0.524 | 1.164 | 68.586 | 63.785 | 0.930 | 3 | 1 | 0.955 | 1.051 |
| Ex. 20 | 0.45 | 0 | 70 | 0.643 | 1.428 | 73.417 | 66.075 | 0.900 | 3 | 1 | 0.924 | 1.072 |
| Ex. 21 | 0.5 | 45 | 55 | 1.598 | 3.195 | 28.738 | 25.002 | 0.870 | 4 | 2 | 1.035 | 1.076 |
| Ex. 22 | 0.6 | 45 | 70 | 0.877 | 1.461 | 29.047 | 25.271 | 0.870 | 4 | 2 | 0.989 | 1.080 |
| Ex. 23 | 0.5 | 50 | 75 | 0.660 | 1.319 | 30.713 | 26.721 | 0.870 | 4 | 2 | 1.035 | 1.098 |
| Ex. 24 | 0.45 | 0 | 75 | 0.500 | 1.111 | 77.635 | 65.213 | 0.840 | 3 | 1 | 0.862 | 1.099 |
| Ex. 25 | 0.5 | 45 | 65 | 1.123 | 2.247 | 31.435 | 26.405 | 0.840 | 4 | 2 | 0.999 | 1.111 |
| Ex. 26 | 0.45 | 0 | 80 | 0.342 | 0.760 | 81.791 | 65.433 | 0.800 | 3 | 1 | 0.821 | 1.137 |
| Ex. 27 | 0.5 | 45 | 70 | 0.877 | 1.753 | 33.105 | 26.484 | 0.800 | 4 | 2 | 0.951 | 1.141 |
| Ex. 28 | 0.3 | 0 | 75 | 0.500 | 1.667 | 83.449 | 66.759 | 0.800 | 3 | 1 | 0.909 | 1.155 |
| Ex. 29 | 0.5 | 30 | 45 | 1.577 | 3.155 | 35.104 | 26.328 | 0.750 | 4 | 2 | 0.892 | 1.185 |
| Ex. 30 | 0.5 | 20 | 40 | 1.412 | 2.824 | 37.456 | 26.219 | 0.700 | 4 | 2 | 0.832 | 1.249 |
| Ex. 31 | 0.5 | 10 | 40 | 1.192 | 2.384 | 40.000 | 24.000 | 0.600 | 4 | 2 | 0.714 | 1.332 |

Based on the normalized leading edge droop effect nLEDE values in Examples 1-31 of Table 2, it was determined that gas turbine engine and airfoil profile designs with an nLEDE value in the range of 1 to 1.332 (i.e., $1 \le nLEDE \le 1.332$) advantageously reduce the formation of peak temperature regions on the pressure side of the plurality of stator vanes and the plurality of rotor blades while also reducing cooling requirements, improving system performance, and improving durability.

Table 3 below illustrated minimum and maximum values for the solidity $\sigma$, the leading edge angle $\mu_{LE}$, the trailing edge angle $\mu_{TE}$, the camber line angle $\lambda$, the optimal leading edge droop factor $\lambda'$, the airfoil type R, and the constant b along with a range of values for the normalized leading edge droop effect nLEDE. Values for the airfoil lift factor Z, the reference airfoil lift factor $Z_{ref}$, and the induced leading air angle $\chi_{ind}$ are not included in Table 3 as their values are based on the values for solidity $\sigma$, the leading edge angle $\mu_{LE}$, and the trailing edge angle $\mu_{TE}$.

TABLE 3

| Parameter: | Element: | Minimum: | Maximum: | Units: |
|---|---|---|---|---|
| $\sigma$ | Solidity | 0.3 | 0.85 | n/a |
| $\mu_{LE}$ | Leading edge angle | 0 | 55 | degrees |
| $\mu_{TE}$ | Trailing edge angle | 40 | 80 | degrees |
| $\lambda$ | Camber line angle | 13.4 | 83.45 | degrees |
| $\lambda'$ | Optimal leading edge droop factor | 0.315 | 1 | n/a |
| R | Airfoil type | R = 1 for airfoils forming first stage stator vanes of the turbine section;<br>R = 2 for all remaining airfoils of the turbine section | | n/a |
| b | Airfoil stage | b = 3 for airfoils forming first stage stator vanes of the turbine section, such as when R = 1;<br>b = 4 for all remaining airfoils of the turbine | | n/a |

TABLE 3-continued

| Parameter: | Element: | Minimum: | Maximum: | Units: |
|---|---|---|---|---|
| | | section, such as when R = 2 | | |
| $n\lambda$ | Normalized camber line angle | 0.358 | 1.189 | n/a |
| nLEDE | Normalized leading edge droop effect | 1 | 1.332 | n/a |

The ranges for the normalized leading edge droop effect nLEDE provided herein capture a specific subset of structures for airfoils forming the plurality of stator vanes and the plurality of rotor blades of the turbine section that takes into consideration various benefits and penalties of choosing one structural architecture of an airfoil over another. The ranges provided are bounded by what is physically possible for operation of the gas turbine engine to operate. For example, increasing a trailing edge angle outside of the ranges provided herein would remove the axial component from the airflow and reducing the trailing edge angle outside the ranges provided herein would create an inefficient design with little to no airfoil turning. In this regard, the relationship discovered, infra, can therefore identify a gas turbine engine with an airfoil profile for the turbine section capable of reducing cooling requirements and improving emissions, and suited for a particular mission requirement, one that takes into account efficiency, weight, thermal capacity needs, complexity, reliability, and other factors influencing the optimal choice for a gas turbine engine with the airfoil profile for the turbine section.

Figures 8, 9:
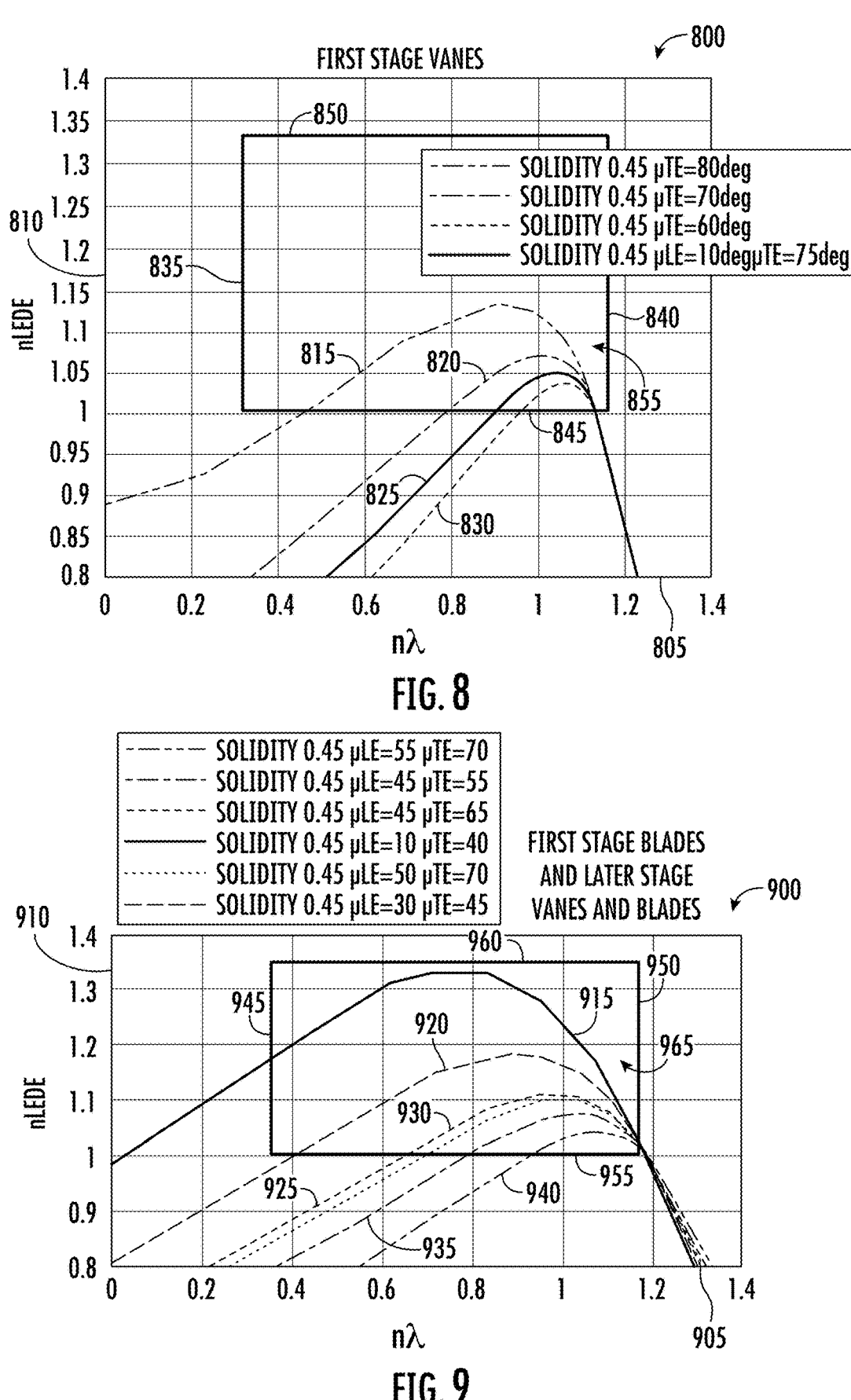
FIG. 8 is a graphical representation of a normalized leading edge droop factor for airfoils forming first stage stator vanes according to an exemplary embodiment of the present disclosure.
FIG. 9 is a graphical representation of a normalized leading edge droop factor for airfoils forming stator vanes and rotor blades according to an exemplary embodiment of the present disclosure.

FIG. 8 is a graphical representation of a normalized leading edge droop factor for airfoils forming first stage stator vanes according to an exemplary embodiment of the present disclosure. More particularly, FIG. 8 provides a graph 800 depicting the normalized leading edge droop effect nLEDE as a function of the normalized camber line angle $n\lambda$ for airfoils 300 forming the first stage 255A of the plurality of HPT stator vanes 68.

For example, the graph 800 has the normalized camber line angle $n\lambda$ on the X-axis 805 and the normalized leading edge droop effect nLEDE on the Y-axis 810. The graph 800 includes a first line 815 indicating a relationship between the normalized camber line angle $n\lambda$ and the normalized leading edge droop effect nLEDE where the solidity $\sigma$ is 0.45 and the trailing edge angle $\mu_{TE}$ is 80°. The graph 800 includes a second line 820 indicating a relationship between the normalized camber line angle $n\lambda$ and the normalized leading edge droop effect nLEDE where the solidity $\sigma$ is 0.45 and the trailing edge angle $\mu_{TE}$ is 70°. The graph 800 includes a third line 825 indicating a relationship between the normalized camber line angle $n\lambda$ and the normalized leading edge droop effect nLEDE where the solidity $\sigma$ is 0.45, the leading edge angle $\mu_{LE}$ is 10° and the trailing edge angle $\mu_{TE}$ is 60°. The graph 800 includes a fourth line 830 indicating a relationship between the normalized camber line angle $n\lambda$ and the normalized leading edge droop effect nLEDE where the solidity $\sigma$ is 0.45 and the trailing edge angle $\mu_{TE}$ is 75°. Unless otherwise indicated above, the leading edge angle $\mu_{LE}$ is 0°.

Moreover, the graph 800 includes a first line 835 where the normalized camber line angle $n\lambda$ is equal to 0.358 and a second line 840 where the normalized camber line angle $n\lambda$ is equal to 1.189. The graph also includes a third line 845 where the normalized leading edge droop effect nLEDE is equal to 1 and a fourth line 850 where the normalized leading edge droop effect nLEDE is equal to 1.332. Accordingly, the graph includes a range 855 where the normalized camber line angle $n\lambda$ is greater than or equal to 0.358 and less than or equal to 1.189 and the normalized leading edge droop effect nLEDE is greater than or equal to 1 and less than or equal to 1.332.

FIG. 9 is a graphical representation of a normalized leading edge droop factor for airfoils forming stator vanes and rotor blades according to an exemplary embodiment of the present disclosure. More particularly, FIG. 9 provides a graph 900 depicting the normalized leading edge droop effect nLEDE as a function of the normalized camber line angle $n\lambda$ for the airfoils 300 forming the second stage 255B of the HPT stator vanes 68 and the airfoils 500 forming first stage 255A and the second stage 255B of the HPT rotor blades 70.

For example, the graph 900 includes the normalized camber line angle $n\lambda$ on the X-axis 905 and the normalized leading edge droop effect nLEDE on the Y-axis 910. The graph 900 includes a first line 915 indicating a relationship between the normalized camber line angle $n\lambda$ and the normalized leading edge droop effect nLEDE where the solidity $\sigma$ is 0.5, the leading edge angle $\mu_{LE}$ is 10°, and the trailing edge angle $\mu_{TE}$ is 40°. The graph 900 includes a second line 920 indicating a relationship between the normalized camber line angle $n\lambda$ and the normalized leading edge droop effect nLEDE where the solidity $\sigma$ is 0.5, the leading edge angle $\mu_{LE}$ is 30°, and the trailing edge angle $\mu_{TE}$ is 45°. The graph 900 includes a third line 925 indicating a relationship between the normalized camber line angle $n\lambda$ and the normalized leading edge droop effect nLEDE where the solidity $\sigma$ is 0.5, the leading edge angle $\mu_{LE}$ is 45°, and the trailing edge angle $\mu_{TE}$ is 65°. The graph 900 includes a fourth line 930 indicating a relationship between the normalized camber line angle $n\lambda$ and the normalized leading edge droop effect nLEDE where the solidity $\sigma$ is 0.5, the leading edge angle $\mu_{LE}$ is 50°, and the trailing edge angle $\mu_{TE}$ is 70°. The graph 900 includes a fifth line 935 indicating a relationship between the normalized camber line angle $n\lambda$ and the normalized leading edge droop effect nLEDE where the solidity $\sigma$ is 0.5, the leading edge angle $\mu_{LE}$ is 45°, and the trailing edge angle $\mu_{TE}$ is 55°. The graph 900 includes a sixth line 940 indicating a relationship between the normalized camber line angle $n\lambda$ and the normalized leading edge droop effect nLEDE where the solidity $\sigma$ is 0.5, the leading edge angle $\mu_{LE}$ is 55°, and the trailing edge angle $\mu_{TE}$ is 70°.

Moreover, the graph 900 includes a first line 945 where the normalized camber line angle $n\lambda$ is equal to 0.358 and a second line 950 where the normalized camber line angle $n\lambda$ is equal to 1.189. The graph 900 also includes a third line 955 where the normalized leading edge droop effect nLEDE is equal to 1 and a fourth line 960 where the normalized leading edge droop effect nLEDE is equal to 1.332. Accordingly, the graph includes a range 965 where the normalized camber line angle $n\lambda$ is greater than or equal to 0.358 and less than or equal to 1.189 and the normalized leading edge droop effect nLEDE is greater than or equal to 1 and less than or equal to 1.332.

Figure 10:
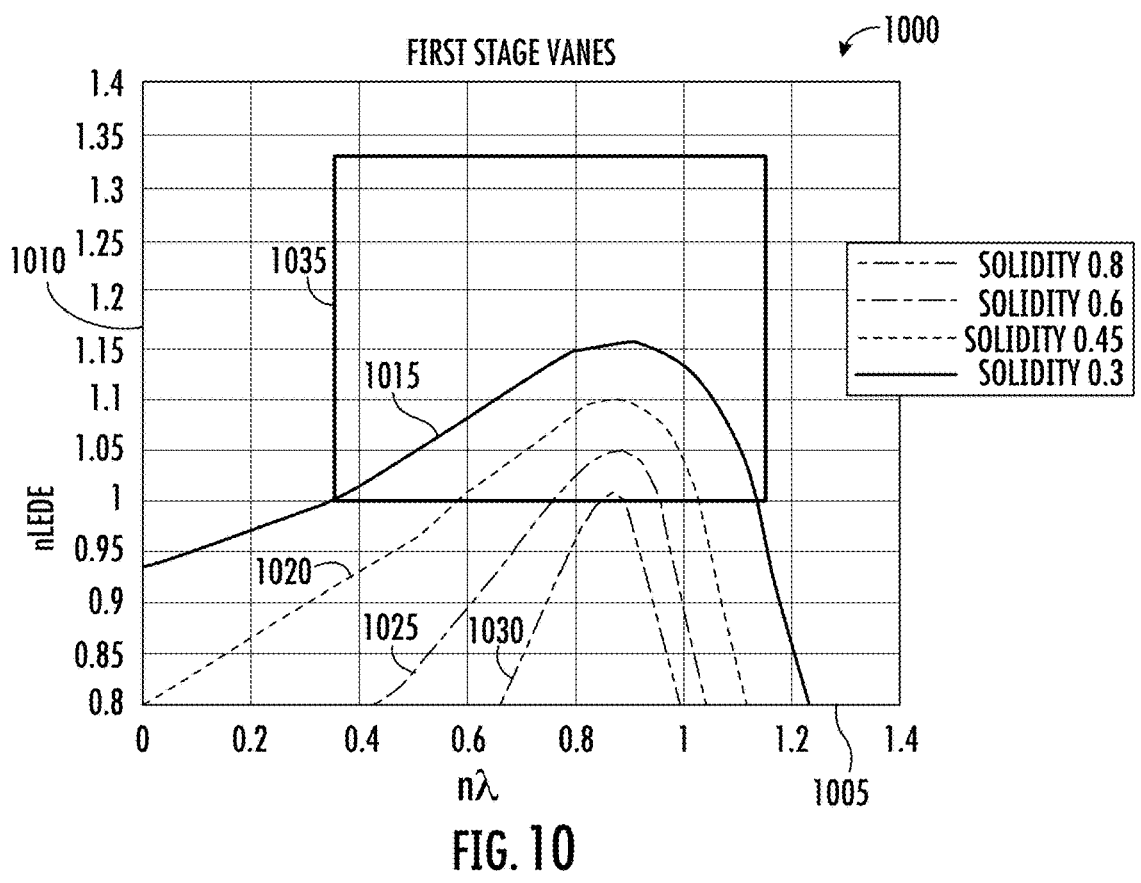
FIG. 10 is a graphical representation of a normalized leading edge droop factor for airfoils forming first stage stator vanes according to an exemplary embodiment of the present disclosure.

FIG. 10 is a graphical representation of a normalized leading edge droop factor for airfoils forming first stage stator vanes according to an exemplary embodiment of the present disclosure. More particularly, FIG. 10 provides a graph 1000 depicting the normalized leading edge droop effect nLEDE as a function of the normalized camber line angle $n\lambda$ for airfoils 300 forming the first stage 255A of the plurality of HPT stator vanes 68.

For example, the graph 1000 has the normalized camber line angle $n\lambda$ on the X-axis 1005 and the normalized leading edge droop effect nLEDE on the Y-axis 1010. The graph 1000 includes a first line 1015 indicating a relationship between the normalized camber line angle $n\lambda$ and the normalized leading edge droop effect nLEDE where the solidity $\sigma$ is 0.3. The graph 1000 includes a second line 1020 indicating a relationship between the normalized camber line angle $n\lambda$ and the normalized leading edge droop effect nLEDE where the solidity $\sigma$ is 0.45. The graph 1000 includes a third line 1025 indicating a relationship between the normalized camber line angle $n\lambda$ and the normalized leading edge droop effect nLEDE where the solidity $\sigma$ is 0.6. The graph 1000 includes a fourth line 1030 indicating a relationship between the normalized camber line angle $n\lambda$ and the normalized leading edge droop effect nLEDE where the solidity $\sigma$ is 0.8. Moreover, the graph 1000 includes a range 1035 where the normalized camber line angle $n\lambda$ is greater than or equal to 0.358 and less than or equal to 1.189 and the normalized leading edge droop effect nLEDE is greater than or equal to 1 and less than or equal to 1.332.

Figure 11:
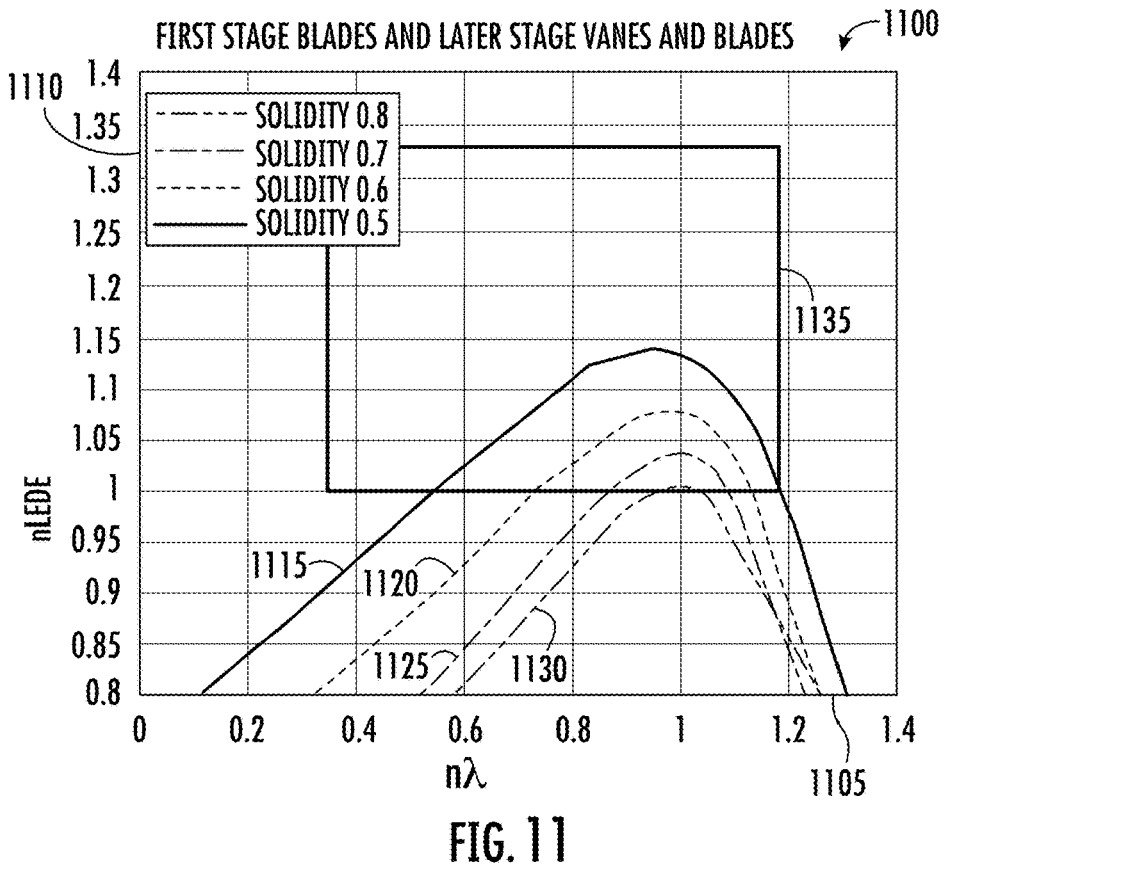
FIG. 11 is a graphical representation of a normalized leading edge droop factor for airfoils forming stator vanes and rotor blades according to an exemplary embodiment of the present disclosure.

FIG. 11 is a graphical representation of a normalized leading edge droop factor for airfoils forming stator vanes and rotor blades according to an exemplary embodiment of the present disclosure. More particularly, FIG. 11 provides a graph 1100 depicting the normalized leading edge droop effect nLEDE as a function of the normalized camber line angle $n\lambda$ for the airfoils 300 forming the second stage 255B of the HPT stator vanes 68 and the airfoils 500 forming first stage 255A and the second stage 255B of the HPT rotor blades 70.

For example, the graph 1100 includes the normalized camber line angle $n\lambda$ on the X-axis 1105 and the normalized leading edge droop effect nLEDE on the Y-axis 1110. The graph 1100 includes a first line 1115 indicating a relationship between the normalized camber line angle $n\lambda$ and the normalized leading edge droop effect nLEDE where the solidity $\sigma$ is 0.5. The graph 1100 includes a second line 1120 indicating a relationship between the normalized camber line angle $n\lambda$ and the normalized leading edge droop effect nLEDE where the solidity $\sigma$ is 0.6. The graph 1100 includes a third line 1125 indicating a relationship between the normalized camber line angle $n\lambda$ and the normalized leading edge droop effect nLEDE where the solidity σ is 0.7. The graph 1100 includes a fourth line 1130 indicating a relationship between the normalized camber line angle nλ and the normalized leading edge droop effect nLEDE where the solidity σ is 0.8. Moreover, the graph 1100 includes a range 1135 where the normalized camber line angle nλ is greater than or equal to 0.358 and less than or equal to 1.189 and the normalized leading edge droop effect nLEDE is greater than or equal to 1 and less than or equal to 1.332.

As set forth herein, minimizing the leading edge droop effect for the airfoils forming the plurality of stator vanes and the plurality of rotor blades provides a range for an optimal leading edge droop factor, which can be used to determine the camber line angle for particular airfoils having a given solidity. Values outside the ranges provided herein would create an inefficient design with little to no airfoil turning, which increases cooling requirements and increases emissions. Accordingly, the present disclosure provides an airfoil design for a plurality of stator vanes and a plurality of rotor blades reduce the formation of peak temperature regions on the pressure side of the plurality of stator vanes and the plurality of rotor blades while also decreasing the solidity in order to reduce cooling requirements, improve emissions, and improve durability.

More specifically, an airfoil profile for stator vanes and rotor blades of a turbine section of a turbine engine is disclosed. The airfoil profile includes increasing a curvature at the leading edge of the airfoils, which creates a fixed stagnation region for hot combustion gases at the leading edge. Fixing the stagnation region of hot combustion gases on the leading edge of the airfoils makes the airfoils easier to cool. Thus, cooling requirements are decreased such that excess cooling air may be utilized by the combustor to improve emissions. Reducing cooling requirements of the airfoils improves durability of the engine.

Further aspects are provided by the subject matter of the following clauses:

A gas turbine engine defining a longitudinal centerline axis, comprising: a compressor section; a combustion section defining a combustion chamber; and a turbine section, the turbine section comprising a plurality of stator vanes and a plurality of rotor blades, the plurality of stator vanes and the plurality of rotor blades each including a plurality of airfoils, each airfoil of the plurality of airfoils comprising a leading edge, a trailing edge, a pressure side, and a suction side opposite the pressure side; wherein the plurality of airfoils define an airfoil type R, wherein the airfoil type R is equal to 1 for the plurality of airfoils forming the plurality of stator vanes of a first stage of the turbine section, and wherein the airfoil type R is equal to 2 for the plurality of airfoils forming the plurality of rotor blades of the first stage of the turbine section and the plurality of airfoils forming the plurality of stator vanes and the plurality of rotor blades of remaining stages of the turbine section; wherein an airfoil of the plurality of airfoils defines: a chord line extending from the leading edge to the trailing edge along the pressure side, a suction side tangency point, a first reference line extending from the leading edge perpendicular to the chord line, a second reference line extending from the leading edge to the suction side tangency point, a third reference line extending through the leading edge parallel to the longitudinal centerline axis, a leading edge angle ($\mu_{LE}$) between the third reference line and the second reference line, a trailing edge reference circle centered on the trailing edge, the trailing edge reference circle intersecting the pressure side at a first point, intersecting the suction side at a second point, and defining a midpoint between the first point and the second point, a fourth reference line extending from the midpoint to the trailing edge, a fifth reference line extending through the trailing edge parallel to the longitudinal centerline axis, a trailing edge angle ($\mu_{TE}$) between the fourth reference line and the fifth reference line, an arc length defined by a first length (a) and a second length (b), the second length (b) perpendicular to the first length (a), and a camber line angle (λ) defined between the first reference line and the second reference line; wherein the turbine section defines: a solidity (σ) of the plurality of airfoils, the solidity (σ) is defined by an axial width (AW) of each of the plurality of airfoils and a pitch (P) of the plurality of airfoils, the solidity (σ) equal to $$\frac{AW}{P},$$

an airfoil lift factor (Z) equal to:

$$\left(\frac{2}{\sigma}\right) \cdot \left[ (\cos \mu_{TE}^2) \cdot (\tan \mu_{LE} + \tan \mu_{TE}) \right],$$

a reference airfoil lift factor ($Z_{ref}$) based on the airfoil lift factor Z where the solidity σ is equal to 1, the reference airfoil lift factor ($Z_{ref}$) equal to:

$$2 \cos u_{TE}^2 (\tan u_{LE} - \tan u_{TE}),$$

an induced leading edge air angle ($\chi_{ind}$) based on a reference airfoil lift factor ($Z_{ref}$) where the solidity (σ) is equal to 1, the induced leading edge air angle ($\chi_{ind}$) equal to:

$$\left\{ \tan^{-1} \left[ \frac{z_{ref}/\sigma}{2 \cos \mu_{TE}^2} \right] - \tan \mu_{TE} \right\} - \mu_{LE},$$

an optimal leading edge droop factor (λ'), wherein $\lambda = \lambda' \cdot \chi_{ind}$, a first heat transfer factor ($Nnd_r$) based on a second heat transfer factor ($Nnd_c$) and a constant (b), the induced leading edge air angle ($\chi_{ind}$), the second heat transfer factor ($Nnd_c$) equal to:

$$\sqrt{\left( 80.54 \cos(\chi_{ind})^{0.612} \right)^2 + \left( 193.64 \cdot b \cdot \sin(\chi_{ind})^{0.804} \right)^2},$$

the first heat transfer factor ($Nnd_r$) equal to:

$$\frac{Nnd_c}{Nnd_c(\chi_{ind} = 0)},$$

wherein the constant (b) is equal to 3 when the airfoil type R is equal to 1 and the constant (b) is equal to 4 when the airfoil type R is equal to 2, and a leading edge droop effect (LEDE), the LEDE equal to:

$$Nnd_r + 0.075 \left( 0.05 \left( 1 + \frac{Rb\pi\lambda a}{0.5\sqrt{1+b^2}} \right)^6 \right);$$

23 and wherein $$1 \leq \frac{LEDE(\lambda' = 1)}{LEDE} < 1.332.$$

The gas turbine engine of any preceding clause, wherein solidity ($\sigma$) is greater than or equal to 0.3 and less than or equal to 0.85.

The gas turbine engine of any preceding clause, wherein: the leading edge angle ($\mu_{LE}$) is greater than or equal to 0° and less than or equal to 55°; and the trailing edge angle ($\mu_{TE}$) is greater than or equal to 40° and less than or equal to 80°.

The gas turbine engine of any preceding clause, wherein the optimal leading edge droop factor ($\lambda'$) is greater than 0.315 and less than or equal to 1.

The gas turbine engine of any preceding clause, wherein a normalized camber line angle (n$\lambda$) is equal to: $\lambda' \cdot Z^{0.25}$.

The gas turbine engine of any preceding clause, wherein the normalized camber line angle (n$\lambda$) is greater than 0.358 and less than or equal to 1.189.

The gas turbine engine of any preceding clause, wherein: the plurality of airfoils define an axial width extending between the leading edge and the trailing edge along the longitudinal centerline axis; and the trailing edge reference circle includes a diameter equal to 20% of the axial width.

The gas turbine engine of claim 1, wherein: the plurality of stator vanes and the plurality of rotor blades comprise a first plurality of stator vanes and a first plurality of rotor blades; the turbine section comprises a first turbine stage including the first plurality of stator vanes and the first plurality of rotor blades and a second turbine second stage including a second plurality of stator vanes and a second plurality of rotor blades; and the first plurality of stator vanes, the first plurality of rotor blades, the second plurality of stator vanes, and the second plurality of rotor blades include the plurality of airfoils.

The gas turbine engine of claim 1, wherein: the turbine section comprises a first turbine stage including the plurality of stator vanes and the plurality of rotor blades; the plurality of airfoils form the plurality of stator vanes of the first turbine stage such that the airfoil type R is equal to 1; and the LEDE is equal to:

$$Nnd_r + 0.075 \left( 0.05 \left( 1 + \frac{1 \cdot 3\pi\lambda a}{0.5\sqrt{1 + 3^2}} \right)^6 \right).$$

The gas turbine engine of claim 1, wherein: the plurality of stator vanes and the plurality of rotor blades comprise a first plurality of stator vanes and a first plurality of rotor blades; the turbine section comprises a first turbine stage including the first plurality of stator vanes and the first plurality of rotor blades and a second turbine second stage including a second plurality of stator vanes and a second plurality of rotor blades; and the plurality of airfoils form one or more of the first plurality of rotor blades, the second plurality of stator vanes, and the second plurality of rotor blades such that the airfoil type is equal to 2; the LEDE is equal to:

$$Nnd_r + 0.075 \left( 0.05 \left( 1 + \frac{2 \cdot 4 \cdot \pi\lambda a}{0.5\sqrt{1 + 4^2}} \right)^6 \right).$$

24

A gas turbine engine, comprising: a compressor section; a combustion section defining a combustion chamber, the combustion section including a plurality of fuel nozzles in fluid communication with the combustion chamber; and a turbine section, the compressor section, the combustion section, and the turbine section disposed in serial flow order along a longitudinal centerline axis of the gas turbine engine, the turbine section comprising a first turbine stage including a first plurality of stator vanes and a first plurality of rotor blades and a second turbine second stage including a second plurality of stator vanes and a second plurality of rotor blades, the first plurality of stator vanes, the first plurality of rotor blades, the second plurality of stator vanes, and the second plurality of rotor blades including a plurality of airfoils, each airfoil of the plurality of airfoils comprising a leading edge, a trailing edge, a pressure side extending between the leading edge and the trailing edge, a suction side opposite the pressure side and extending between the leading edge and the trailing edge, each airfoil of the plurality of airfoils further defining: a chord line extending from the leading edge to the trailing edge along the pressure side, a suction side tangency point, a first reference line extending from the leading edge perpendicular to the chord line, a second reference line extending from the leading edge to the suction side tangency point, a camber line angle ($\lambda$) defined between the first reference line and the second reference line, a leading edge angle ($\mu_{LE}$) defined between a third reference line extending through the leading edge parallel to the longitudinal centerline axis and the second reference line, a trailing edge reference circle centered on the trailing edge, the trailing edge reference circle intersecting the pressure side at a first point, intersecting the suction side at a second point, and defining a midpoint between the first point and the second point, a fourth reference line extending from the midpoint to the trailing edge, and a trailing edge angle ($\mu_{TE}$) defined between the fourth reference line and a fifth reference line extending through the trailing edge parallel to the longitudinal centerline axis; wherein the turbine section defines a solidity ($\sigma$) of the plurality of airfoils, an airfoil lift factor (Z), an induced leading edge air angle ($\chi_{ind}$), an optimal leading edge droop factor ($\lambda'$), a first heat transfer factor (Nnd$_r$), a penalty factor ($\Delta$DQW), and a leading edge droop effect (LEDE), the LEDE equal to: Nnd$_r$+0.075($\Delta$DQW).

The gas turbine engine of any preceding clause, wherein the leading edge droop effect (LEDE) is greater than or equal to 1.8 and less than or equal to 5.47.

The gas turbine engine of any preceding clause, wherein the $\sigma$ is defined by an axial width (AW) of the plurality of airfoils and a pitch (P) of the plurality of airfoils, the $\alpha$ equal to $$\frac{AW}{P}.$$

The gas turbine engine of any preceding clause, wherein the airfoil lift factor (Z) is equal to:

$$\left( \frac{2}{\sigma} \right) \cdot \left[ \left( \cos \mu_{TE}^2 \right) \cdot \left( \tan \mu_{LE} + \tan \mu_{TE} \right) \right].$$

The gas turbine engine of any preceding clause, wherein the induced leading edge air angle ($\chi_{ind}$) is based on a reference airfoil lift factor ($Z_{ref}$) where the solidity ($\sigma$) is equal to 1, and wherein the induced leading edge air angle ($\lambda_{ind}$) equal to:

$$\left\{ \tan^{-1} \left[ \frac{z_{ref/\sigma}}{2 \cos \mu_{TE}^2} \right] - \tan \mu_{TE} \right\} - \mu_{LE}.$$

The gas turbine engine of any preceding clause, wherein the reference airfoil lift factor ($Z_{ref}$) is equal to:

$$2 \cos \mu_{TE}^2 (\tan \mu_{LE} - \tan \mu_{TE}).$$

The gas turbine engine of any preceding clause, wherein the camber line angle ($\lambda$) is equal to: $\lambda' \cdot \chi_{ind}$.

The gas turbine engine of any preceding clause, wherein: the first heat transfer factor ($Nnd_r$) is based on a second heat transfer factor ($Nnd_c$) and a constant b, the induced leading edge air angle ($\chi_{ind}$), the second heat transfer factor ($Nnd_r$) equal to:

$$\frac{Nnd_c}{Nnd_{c(\chi_{ind} = 0)}};$$

and the second heat transfer factor ($Nnd_c$) is equal to:

$$\sqrt{80.54 \cos(\chi_{ind})^{0.612})^2 + (193.64 \cdot b \cdot \sin(\chi_{ind})^{0.804})^2}.$$

The gas turbine engine of any preceding clause, wherein: the constant b is equal to 3 for the plurality of airfoils of the first plurality of stator vanes; and the constant b is equal to 4 for the plurality of airfoils of the first plurality of rotor blades, the second plurality of stator vanes, and the second plurality of rotor blades.

The gas turbine engine of any preceding clause, wherein the penalty factor ($\Delta DQW$) is based on an airfoil type R, a first length (a), and a second length (b), the second length (b) perpendicular to the first length (a), the penalty factor ($\Delta DQW$) equal to:

$$0.05 \left( 1 + \frac{Rb\pi\lambda a}{0.5\sqrt{a^2 + b^2}} \right)^6.$$

The gas turbine engine of any preceding clause, wherein: the airfoil type R is equal to 1 for the plurality of airfoils of the first plurality of stator vanes; and the airfoil type R is equal to 2 for the plurality of airfoils of the first plurality of rotor blades, the second plurality of stator vanes, and the second plurality of rotor blades.

The gas turbine engine of any preceding clause, wherein the solidity ($\sigma$) is greater than or equal to 0.3 and less than or equal to 0.85.

The gas turbine engine of any preceding clause, wherein: the leading edge angle ($\mu_{LE}$) is greater than or equal to 0° and less than or equal to 55°; and the trailing edge angle ($\mu_{TE}$) is greater than or equal to 400 and less than or equal to 80°.

The gas turbine engine of any preceding clause, wherein the optimal leading edge droop factor ($\lambda'$) is greater than or equal to 0.315 and less than or equal to 1.

The gas turbine engine of any preceding clause, wherein: the plurality of airfoils define an axial width extending between the leading edge and the trailing edge along the longitudinal centerline axis; and the trailing edge reference circle includes a diameter equal to 20% of the axial width.

An airfoil assembly for a gas turbine engine including at least two airfoils, each airfoil of the at least two airfoils comprising: a leading edge, a trailing edge, a pressure side extending between the leading edge and the trailing edge, and a suction side opposite the pressure side and extending between the leading edge and the trailing edge; and wherein each airfoil of the at least two airfoils define a chord line extending from the leading edge to the trailing edge along the pressure side, a suction side tangency point, a first reference line extending from the leading edge perpendicular to the chord line, a second reference line extending from the leading edge to the suction side tangency point, a camber line angle ($\lambda$) defined between the first reference line and the second reference line, and a solidity ($\sigma$) based on an axial width (AW) of the at least two airfoils and a pitch (P) between adjacent ones of the at least two airfoils.

The airfoil assembly of any preceding clause, wherein the solidity ($\sigma$) is equal to $$\frac{AW}{P}.$$

The airfoil assembly of any preceding clause, wherein: the at least two airfoils are a plurality of stator vanes of the gas turbine engine; and the solidity ($\sigma$) is greater than or equal to 0.3 and less than or equal to 0.85.

The airfoil assembly of any preceding clause, wherein: the at least two airfoils are a plurality of rotor blades of the gas turbine engine; and the solidity ($\sigma$) is less than or equal to 0.85.

The airfoil assembly of any preceding clause, wherein: the at least two airfoils are a plurality of stator vanes of the gas turbine engine; and the camber line angle ($\lambda$) is greater than or equal to 13.4° and less than or equal to 83.45°.

The airfoil assembly of any preceding clause, wherein: the at least two airfoils are a plurality of rotor blades of the gas turbine engine; and the camber line angle ($\lambda$) is greater than or equal to 13.4° and less than or equal to 83.45°.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a longitudinal centerline axis, comprising:
   a compressor section;
   a combustion section defining a combustion chamber; and
   a turbine section, the turbine section comprising a plurality of stator vanes and a plurality of rotor blades, the plurality of stator vanes and the plurality of rotor blades each including a plurality of airfoils, each airfoil of the plurality of airfoils comprising a leading edge, a trailing edge, a pressure side, and a suction side opposite the pressure side;

wherein the plurality of airfoils define an airfoil type R, wherein the airfoil type R is equal to 1 for the plurality of airfoils forming the plurality of stator vanes of a first stage of the turbine section, and wherein the airfoil type R is equal to 2 for the plurality of airfoils forming the plurality of rotor blades of the first stage of the turbine section and the plurality of airfoils forming the plurality of stator vanes and the plurality of rotor blades of remaining stages of the turbine section;

wherein an airfoil of the plurality of airfoils defines:

a chord line extending from the leading edge to the trailing edge along the pressure side, a suction side tangency point, a first reference line extending from the leading edge perpendicular to the chord line, a second reference line extending from the leading edge to the suction side tangency point, a third reference line extending through the leading edge parallel to the longitudinal centerline axis, a leading edge angle ($\mu_{LE}$) between the third reference line and the second reference line, a trailing edge reference circle centered on the trailing edge, the trailing edge reference circle intersecting the pressure side at a first point, intersecting the suction side at a second point, and defining a midpoint between the first point and the second point, a fourth reference line extending from the midpoint to the trailing edge, a fifth reference line extending through the trailing edge parallel to the longitudinal centerline axis, a trailing edge angle ($\mu_{TE}$) between the fourth reference line and the fifth reference line, an arc length defined by a first length (a) and a second length (b), the second length (b) perpendicular to the first length (a), and a camber line angle ($\lambda$) defined between the first reference line and the second reference line;

wherein the turbine section defines:

a solidity ($\sigma$) of the plurality of airfoils, the solidity ($\sigma$) is defined by an axial width (AW) of each of the plurality of airfoils and a pitch (P) of the plurality of airfoils, the solidity ($\sigma$) equal to $$\frac{AW}{P},$$

an airfoil lift factor (Z) equal to:

$$\left(\frac{2}{\sigma}\right) \cdot \left[\left(\cos \mu_{TE}{}^2\right) \cdot \left(\tan \mu_{LE} + \tan \mu_{TE}\right)\right],$$

a reference airfoil lift factor ($Z_{ref}$) based on the airfoil lift factor Z where the solidity $\sigma$ is equal to 1, the reference airfoil lift factor ($Z_{ref}$) equal to:

$$2 \cos u_{TE}{}^2 (\tan \mu_{LE} - \tan \mu_{TE}),$$

an induced leading edge air angle ($\chi_{ind}$) based on a reference airfoil lift factor ($Z_{ref}$) where the solidity ($\sigma$) is equal to 1, the induced leading edge air angle ($\chi_{ind}$) equal to:

$$\left\{\tan^{-1}\left[\frac{Z_{ref/\sigma}}{2 \cos \mu_{TE}{}^2}\right] - \tan \mu_{TE}\right\} - \mu_{LE},$$

an optimal leading edge droop factor ($\lambda'$), wherein $\lambda = \lambda' \cdot \chi_{ind}$, a first heat transfer factor ($Nnd_r$) based on a second heat transfer factor ($Nnd_c$) and a constant (b), the induced leading edge air angle ($\chi_{ind}$), the second heat transfer factor ($Nnd_c$d) equal to:

$$\sqrt{80.54 \cos(\chi_{ind})^{0.612})^2 + \left(193.64 \cdot b \cdot \sin(\chi_{ind})^{0.804}\right)^2},$$

the first heat transfer factor ($Nnd_r$) equal to:

$$\frac{Nnd_c}{Nnd_c(\chi_{ind} = 0)},$$

wherein the constant (b) is equal to 3 when the airfoil type R is equal to 1 and the constant (b) is equal to 4 when the airfoil type R is equal to 2, and a leading edge droop effect (LEDE), the LEDE equal to:

$$Nnd_r + 0.075\left(0.05\left(1 + \frac{Rb\pi\lambda a}{0.5\sqrt{1+b^2}}\right)^6\right);$$

and wherein $$1 \le \frac{LEDE(\lambda' = 1)}{LEDE} < 1.332.$$

2. The gas turbine engine of claim 1, wherein the solidity ($\sigma$) is greater than or equal to 0.3 and less than or equal to 0.85.

3. The gas turbine engine of claim 1, wherein the leading edge angle ($\mu_{LE}$) is greater than or equal to 0° and less than or equal to 55°.

4. The gas turbine engine of claim 1, wherein the trailing edge angle ($\mu_{TE}$) is greater than or equal to 40° and less than or equal to 80°.

5. The gas turbine engine of claim 1, wherein the optimal leading edge droop factor ($\lambda'$) is greater than or equal to 0.315 and less than or equal to 1.

6. The gas turbine engine of claim 1, wherein camber line angle ($\lambda$) is greater than or equal to 13.4 degrees and less than or equal to 83.45 degrees.

7. The gas turbine engine of claim 1, wherein a normalized camber line angle (n$\lambda$) is equal to: $\lambda' \cdot Z^{0.25}$.

8. The gas turbine engine of claim 7, wherein the normalized camber line angle (n$\lambda$) is greater than or equal to 0.358 and less than or equal to 1.189.

9. The gas turbine engine of claim 1, wherein:

the plurality of stator vanes and the plurality of rotor blades comprise a first plurality of stator vanes and a first plurality of rotor blades;

the turbine section comprises a first turbine stage including the first plurality of stator vanes and the first plurality of rotor blades and a second turbine second stage including a second plurality of stator vanes and a second plurality of rotor blades; and the first plurality of stator vanes, the first plurality of rotor blades, the second plurality of stator vanes, and the second plurality of rotor blades include the plurality of airfoils.

10. The gas turbine engine of claim 1, wherein:

the turbine section comprises a first turbine stage including the plurality of stator vanes and the plurality of rotor blades;

the plurality of airfoils form the plurality of stator vanes of the first turbine stage such that the airfoil type R is equal to 1; and the LEDE is equal to:

$$Nnd_r + 0.075 \left(0.05 \left(1 + \frac{1 \cdot 3 \cdot \pi \lambda a}{0.5\sqrt{1+3^2}}\right)^6\right).$$

11. The gas turbine engine of claim 1, wherein:

the plurality of stator vanes and the plurality of rotor blades comprise a first plurality of stator vanes and a first plurality of rotor blades;

the turbine section comprises a first turbine stage including the first plurality of stator vanes and the first plurality of rotor blades and a second turbine second stage including a second plurality of stator vanes and a second plurality of rotor blades; and the plurality of airfoils form one or more of the first plurality of rotor blades, the second plurality of stator vanes, and the second plurality of rotor blades such that the airfoil type is equal to 2; and the LEDE is equal to:

$$Nnd_r + 0.075 \left(0.05 \left(1 + \frac{2 \cdot 4 \cdot \pi \lambda a}{0.5\sqrt{1+4^2}}\right)^6\right).$$

\* \* \* \* \*